United States Patent
Hori et al.

(10) Patent No.: US 6,879,408 B1
(45) Date of Patent: Apr. 12, 2005

(54) PRINTER DRIVER, PRINTER, AND RECORDING MEDIUM ON WHICH PRINTER DRIVER PROGRAM IS RECORDED

(75) Inventors: Ryuichi Hori, Hiroshima (JP); Masahiro Horie, Kuga (JP); Shuji Okamoto, Kure (JP)

(73) Assignee: Matsushita Electric Industrial Co., Ltd., Osaka-Fu (JP)

( * ) Notice: Subject to any disclaimer, the term of this patent is extended or adjusted under 35 U.S.C. 154(b) by 0 days.

(21) Appl. No.: 09/526,482

(22) Filed: Mar. 15, 2000

(30) Foreign Application Priority Data

Mar. 17, 1999 (JP) ........................................... 11/071463

(51) Int. Cl.[7] .............................................. G06F 15/00
(52) U.S. Cl. ..................... 358/1.13; 358/1.11; 358/1.15
(58) Field of Search .......................... 358/1.1, 1.5, 1.9, 358/1.11, 1.12, 1.14, 1.15, 1.13

(56) References Cited

U.S. PATENT DOCUMENTS

| | | | | |
|---|---|---|---|---|
| 4,949,188 A | * | 8/1990 | Sato | .......................... 358/448 |
| 5,500,928 A | * | 3/1996 | Cook et al. | .................. 345/619 |
| 5,600,768 A | * | 2/1997 | Andresen | ..................... 345/629 |
| 6,166,824 A | * | 12/2000 | Kadota | ....................... 358/1.15 |
| 6,320,667 B1 | * | 11/2001 | Mitsuhashi | .................. 358/1.1 |
| 6,535,293 B1 | * | 3/2003 | Mitsuhashi | ................ 358/1.13 |
| 6,567,179 B1 | * | 5/2003 | Sato et al. | .................. 358/1.15 |
| 6,600,569 B1 | * | 7/2003 | Osada et al. | ................ 358/1.12 |
| 6,667,812 B1 | * | 12/2003 | Sato et al. | ................. 358/1.15 |
| 6,687,019 B1 | * | 2/2004 | Yang | ......................... 358/1.15 |

* cited by examiner

Primary Examiner—Mark Wallerson
(74) Attorney, Agent, or Firm—Wenderoth, Lind & Ponack, L.L.P.

(57) ABSTRACT

A printer and a printer driver automatically execute setting processing relevant to information unique to each printer without a user's intervention. Printer language specifications indicating a correspondence between plot objects and printer languages are stored. Printer language specifications setting data predetermined for the printer language specifications are generated. Control language specifications indicating a correspondence between control elements and control languages are stored. Control language specifications setting data predetermined for the control language specifications are generated. According to a trigger instructing a host PC to start transmission, the generated language specifications setting data to a bi-directional communication part are transmitted. The bi-directional communication part transmits the received language specifications setting data through a transmission path to the host PC.

48 Claims, 24 Drawing Sheets

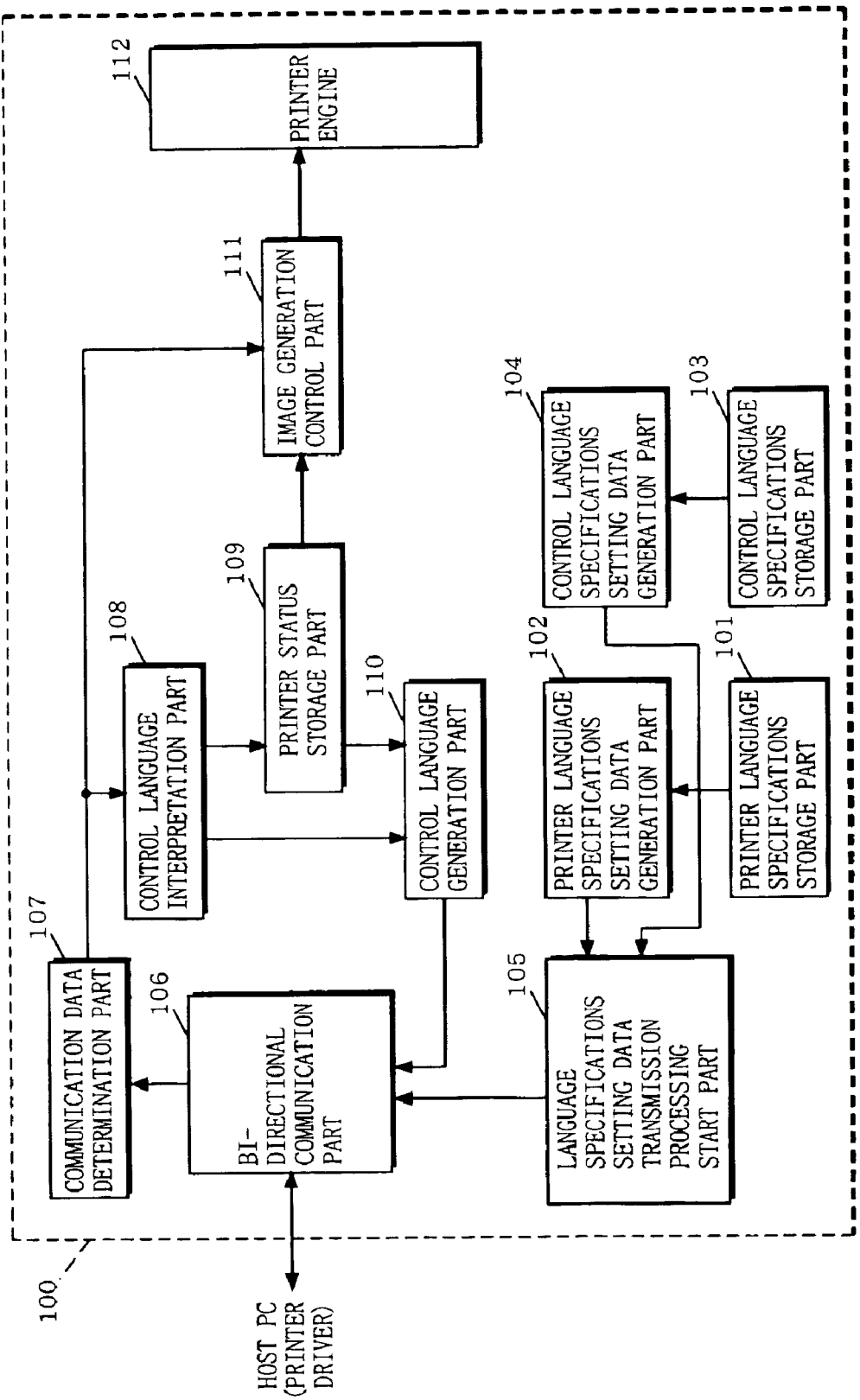

FIG. 2

| PLOT OBJECT | COMMAND |
|---|---|
| CIRCLE | CIRCLE, CENTER X COORDINATE, CENTER Y COORDINATE, RADIUS ; |
| RECTANGLE | RECTANGLE, UPPER-LEFT X COORDINATE, UPPER-LEFT Y COORDINATE, LOWER-RIGHT X COORDINATE, LOWER-RIGHT Y COORDINATE ; |
| LINE | LINE, STARTPOINT X COORDINATE, STARTPOINT Y COORDINATE, ENDPOINT X COORDINATE, ENDPOINT Y COORDINATE ; |
| ELLIPSE | ELLIPSE, STARTPOINT X COORDINATE, STARTPOINT Y COORDINATE, ENDPOINT X COORDINATE, ENDPOINT Y COORDINATE ; |
| ... | ... |

FIG. 4

| CONTROL ELEMENT | COMMAND |
|---|---|
| INPUT TRAY | INPUTTRAY, TRAY NUMBER ; |
| INTERNALLY-PROVIDED MEMORY CAPACITY | MEMORY ; |
| PAPER SELECTION | PAPER, PAPER SIZE ; |
| ... | ... |

F I G. 17

| PLOT OBJECT | COMMAND | LINK INFORMATION | ERROR INFORMATION |
|---|---|---|---|
| CIRCLE | CIRCLE, CENTER X COORDINATE, CENTER Y COORDINATE, RADIUS ; | RECTANGLE | × |
| RECTANGLE | RECTANGLE, UPPER-LEFT X COORDINATE, UPPER-LEFT Y COORDINATE, LOWER-RIGHT X COORDINATE, LOWER-RIGHT Y COORDINATE ; | LINE | ○ |
| LINE | LINE, STARTPOINT X COORDINATE, STARTPOINT Y COORDINATE, ENDPOINT X COORDINATE, ENDPOINT Y COORDINATE ; | NONE | ○ |
| ELLIPSE | ELLIPSE, STARTPOINT X COORDINATE, STARTPOINT Y COORDINATE, ENDPOINT X COORDINATE, ENDPOINT Y COORDINATE ; | RECTANGLE | ○ |
| ... | ... | ... | ... |

FIG. 18

| CONTROL ELEMENT | COMMAND | LINK INFORMATION | ERROR INFORMATION |
|---|---|---|---|
| INPUT TRAY | INPUTTRAY, TRAY NUMBER ; | OUTPUT TRAY | ○ |
| INTERNALLY-PROVIDED MEMORY CAPACITY | MEMORY ; | NONE | ○ |
| PAPER SELECTION | PAPER, PAPER SIZE ; | PRINTING QUALITY | × |
| ... | ... | ... | ... |

FIG. 19
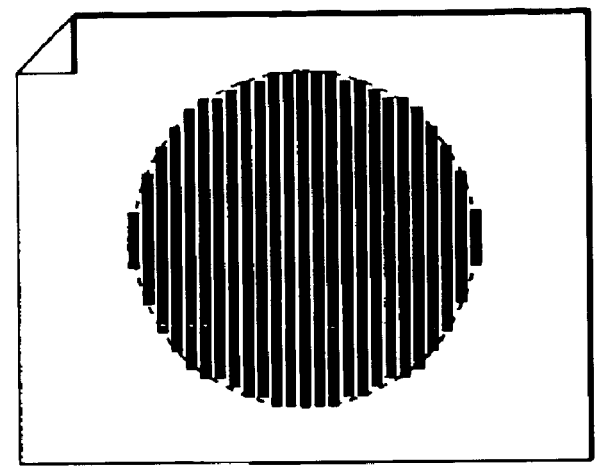
(c)
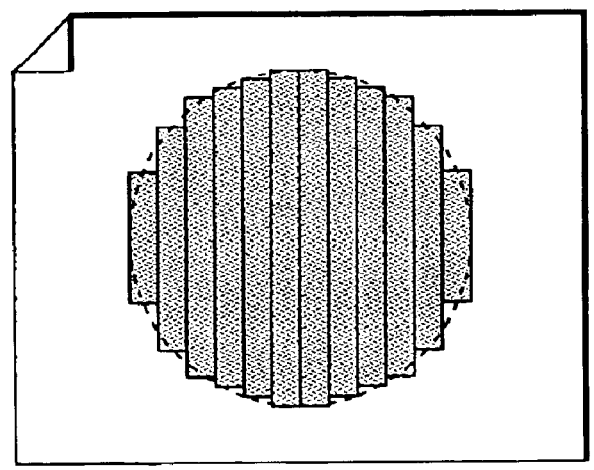
(b)
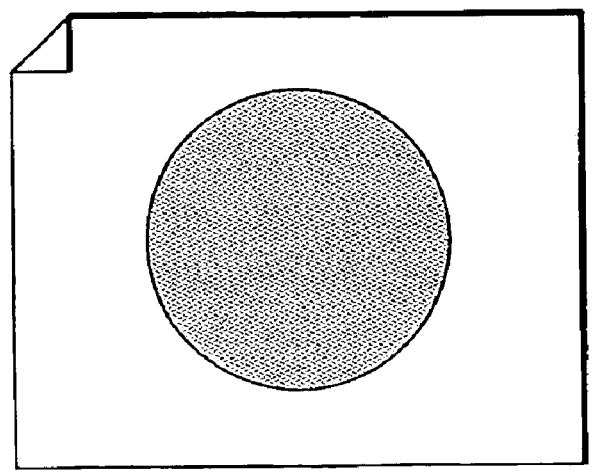
(a)

FIG. 23

| PRINTER INFORMATION — INPUT TRAY | | |
|---|---|---|
| INPUT TRAY (UPPER) | PAPER SIZE A4 | AVAILABLE |
| INPUT TRAY (MIDDLE) | PAPER SIZE A3 | UNAVAILABLE |
| INPUT TRAY (LOWER) | PAPER SIZE B4 | UNAVAILABLE |

PRINTER DRIVER, PRINTER, AND RECORDING MEDIUM ON WHICH PRINTER DRIVER PROGRAM IS RECORDED

BACKGROUND OF THE INVENTION

1. Field of the Invention

The present invention relates to printers, printer drivers, and recording media on which printer driver programs are recorded, and more particularly to a printer capable of communicating with a host information processor via a given communication medium, a printer driver runs on the host information processor, and a recording medium on which a program for realizing the printer driver is recorded.

2. Description of the Background Art

As is well-known, a user is expected to construct a system environment where a separately-provided printer is connected to a host information processor (hereinafter, referred to as host PC) in advance for printing graphics and text created in the host PC, typically a personal computer.

Referring to FIG. 24, described below is the conventional system environment where a host PC is connected to a printer. Note that, in this application, a processing program as software is referred to as a "printer driver program", and hardware structure realized by the printer driver program is referred to as a "printer driver".

FIG. 24 is a block diagram exemplarily showing the configuration of the conventional system environment. In FIG. 24, a host PC 2000 and a printer 3000 are interconnected via a communication medium. The host PC 2000 is provided with a comprehensive control part 2001, an application print data generation part 2002, a display part 2003, an input part 2004, and a printer driver 2100. The printer driver 2100 is structured by a bi-directional communication part 2101, a control language interpretation part 2103, a printer settings storage part 2106, a printer language generation part 2107, and a control language generation part 2108. On the other hand, the printer 3000 is provided with a bi-directional communication part 3006, a communication data determination part 3007, a control language interpretation part 3008, a printer status storage part 3009, a control language generation part 3010, an image generation control part 3011, and a printer engine 3012.

First, it is described how the conventional host PC 2000 is operated to print. When the input part 2004 receives a user's instruction for printing executed on an application, the comprehensive control part 2001 instructs the application print data generation part 2002 to generate application print data corresponding to the description in the application, and then outputs the application print data to the printer language generation part 2107 along with a print request. In the printer settings storage part 2106, information unique to the printer 3000 is stored beforehand, e.g., printer language interpretable by the printer, information relevant to a font internally stored in the printer, or information indicating how capable the printer is in the terms of paper size or resolution. In the printer language generation part 2107, the received application print data is converted into printer language print data written in printer language (representing plot objects to be printed) according to the information stored in the printer settings storage part 2106. In the control language generation part 2108, according also to the information stored in the printer settings storage part 2106, control language print data for controlling the printer 3000 is generated from the application print data to select input/output trays or toner concentration, for example. The data is written in control language (representing printer control, such as paper selection for printing, or final touch setting for designating printing format). Such printer language print data and control language print data are transmitted through the bi-directional communication part 2101 to the printer 3000 as communication data.

Next, it is described how the conventional printer 3000 is operated to print. The bi-directional communication part 3006 receives the communication data from the host PC 2000, and then outputs the data to the communication data determination part 3007. After receiving the communication data, the communication data determination part 3007 determines whether or not the communication data is the printer language print data or the control language print data. If determined the communication data as being the printer language print data, the communication data determination part 3007 outputs the data to the image generation control part 3011. Otherwise, the communication data is outputted to the control language interpretation part 3008. In the printer status storage part 3009, current status of the printer 3000 for every setting is stored. In the control language interpretation part 3008, the communication data provided from the communication data determination part 3007, i.e., the control language print data, is interpreted so as to output information relevant to the description thereof (response) directly to the control language generation part 3010 (in a case where the information is relevant to the online/offline status), or via the printer status storage part 3009 (in a case where the information is relevant to the currently selected paper size). In the control language generation part 3010, the information received from the control language interpretation part 3008 or the printer status storage part 3009 is converted into control language data in a predetermined format for output to the bi-directional communication part 3006. The image generation control part 3011 is structured by a printer language interpretation part, an image generation part, and an image memory (not shown), for example, and the communication data provided from the communication data determination part 3007, i.e., the printer language print data is interpreted therein, and then the printer engine 3012 is controlled in accordance with the description thereof. The printer engine 3012 is a mechanism to print paper, and is operated to print the plot objects under the control of the image generation control part 3011.

On the other hand, the control language is also used when the host PC 2000 inquires about the inner state of the printer 3000, e.g., online/offline, job processing, availability of a perfecting press unit, or internally-provided memory capacity. If this is the case, upon inquiry from the comprehensive control part 2001 of the host PC 2000, the control language generation part 2108 generates control language data for transmission to the printer 3000 via the bi-directional communication part 2101.

A response from the printer 3000 to the inquiry is provided to the bi-directional communication part 2101, interpreted in the control language interpretation part 2103, and then forwarded to the comprehensive control part 2001. Thereafter, the response is displayed, as appropriate, in the display part 2003.

Typically, the printer driver 2100 (a dotted part in FIG. 24) is structurally realized in such manner that a printer driver program runs on the host PC 2000 and is stored in a not-shown arbitrary memory accessible by the host PC 2000, and then the program is interpreted and executed by a not-shown CPU of the host PC 2000.

Therefore, a user is expected to install or set-up any printer driver program provided by his/her printer manufacturer (in a portable recording medium, such as floppy disk or CD-ROM, or a communication medium) in advance (when constructing system environment) into the host PC 2000.

Generally, the printer language and the control language transmitted/received to/from the host PC and the printer are dependent on who is the printer manufacturer or the characteristics and resources of the printer, for example, and thus are heavily restricted and varied in specification. Accordingly, the host PC needs to change the printer language data and the control language data stored therein (in the printer settings storage part 2106) for every printer even if the printer driver (OS relevant to printer) therein remains structurally the same. To be more specific, the host PC needs to have printer drivers (programs) varied in type for every printer in use.

This makes managing driver data complicated, and also wastes the limited storage resources of the host PC.

Especially, in a case where a single printer is connected to a plurality of host PCs via an interface, such as network, every host PC needs to install and set each different printer driver (program) therein, thereby rendering even simple data change cumbersome.

Further, even when the printer driver (program) has been set-up, the printer may not properly process print data provided from the host PC for some unexpected reasons and cause a print error. To avoid such error, a printer firmware on the printer or a printer driver (program) on the host PC are usually re-installed or re-set (upgraded). The problem herein is, however, upgrading the printer driver (program) is cumbersome, and waiting is inevitable if software for upgrading is not yet available.

SUMMARY OF THE INVENTION

Therefore, an object of the present invention is to provide a printer, a printer driver (host PC), and a recording medium on which a printer driver program is recorded by a communication technique predetermined therefor, being capable of automatically executing setting processing relevant to information unique to each printer (printer language and control language) without user's intervention.

The present invention has the following features to attain the object above.

A first aspect of the present invention is directed to a printer to be connected to a host information processor via a given communication medium, the printer comprising:

a printer language specifications storage part for storing, under the control of an operating system operable on the host information processor, printer language specifications which indicate a correspondence between a plot object forming application print data generated at printing by an application operable on the host information processor and a printer language for printing the plot object on the printer;

a printer language specifications setting data generation part for reading the printer language specifications from the printer language specifications storage part to generate printer language specifications setting data predetermined therefor;

a language specifications setting data transmission processing start part for outputting the printer language specifications setting data generated by the printer language specifications setting data generation part with a predetermined timing; and a bi-directional communication part for receiving the printer language specifications setting data for transmission to the host information processor.

A second aspect of the present invention is directed to a printer to be connected to a host information processor via a given communication medium, the printer comprising:

a control language specifications storage part for storing, under the control of an operating system operable on the host information processor, control language specifications which indicate a correspondence between a control element forming application print data generated at printing by an application operable on the host information processor and a control language for setting the control element on the printer;

a control language specifications setting data generation part for reading the control language specifications from the control language specifications storage part to generate control language specifications setting data predetermined therefor;

a language specifications setting data transmission processing start part for outputting the control language specifications setting data generated by the control language specifications setting data generation means with a predetermined timing; and a bi-directional communication part for receiving the control language specifications setting data for transmission to the host information processor.

As described above, in the first and second aspects, from the printer to the host information processor, the printer language specifications indicating the correspondence between the plot objects and the printer languages, or the control language specifications between the control elements and the control languages can be transmitted. In this manner, if the host information processor (printer driver thereof) is capable of receiving the printer language specifications setting data and the control language specifications setting data, the host information processor can automatically set (install or set-up) the printer language and the control language, without the user's intervention, only by connecting the printer thereto.

According to a third aspect, in the first aspect, the printer further comprises a control language generation part for converting the printer language specifications setting data generated by the printer language specifications setting data generation part into control language data in a predetermined format for output to the language specifications setting data transmission processing start part, wherein the language specifications setting data transmission processing start part outputs the control language data received from the control language generation part to the bi-directional communication part with a predetermined timing.

According to a fourth aspect, in the second aspect, the printer further comprises a control language generation part for converting the control language specifications setting data generated by the control language specifications setting data generation part into control language data in a predetermined format for output to the language specifications setting data transmission processing start part, wherein the language specifications setting data transmission processing start part outputs the control language data received from the control language generation part to the bi-directional communication part with a predetermined timing.

As described above, in the third and fourth aspects, the printer language specifications indicating the correspondence between the plot objects and the printer languages, or the control language specifications between the control elements and the control languages can be added to the control language data for transmission from the printer to the host information processor. In this manner, with the control language data, even if the host information processor (printer driver thereof) is incapable of receiving the printer language specifications setting data and the control language specifications setting data, the host information processor can automatically set (install or set-up) the printer language and the control language, without the user's intervention, only by connecting the printer thereto.

According to a fifth aspect, in the first aspect, the printer further comprises a communication data determination part for determining the type of communication data received from the host information processor via the bi-directional communication part, wherein when the communication data is data asking for the printer language specifications setting data, the communication data determination part instructs the printer language specifications setting data generation part to generate the printer language specifications setting data.

According to a sixth aspect, in the second aspect, the printer further comprises a communication data determination part for determining the type of communication data received from the host information processor via the bi-directional communication part, wherein when the communication data is data asking for the control language specifications setting data, the communication data determination part instructs the control language specifications setting data generation part to generate the control language specifications setting data.

As described above, in the fifth and sixth aspects, from the printer to the host information processor, the printer language specifications indicating the correspondence between the plot objects and the printer languages, or the control language specifications between the control elements and the control languages can be transmitted in accord with the requesting data provided from the host information processor. In this manner, in addition to the effects described in the foregoing, overhead of continuously monitoring setting data on the host information processor can be cut down. Further, with any timing desired by the host information processor (e.g., at rebooting), the printer language specifications setting data and the control language specifications setting data can be transmitted to the host information processor.

According to a seventh aspect, in the first aspect, the printer further comprises a control language interpretation part for further interpreting the predetermined control language data determined by the communication data determination part, wherein when the printer language specifications setting data in the format of the control language data is asked for, the control language interpretation part instructs the printer language specifications setting data generation part to generate the printer language specifications setting data.

According to an eighth aspect, in the sixth aspect, the printer further comprises a control language interpretation part for further interpreting the predetermined control language data determined by the communication data determination part, wherein when the control language specifications setting data in the format of the control language data is asked for, the control language interpretation part instructs the control language specifications setting data generation part to generate the control language specifications setting data.

As described above, in the seventh and eighth aspects, from the printer to the host information processor, the printer language specifications indicating the correspondence between the plot objects and the printer languages, or the control language specifications between the control elements and the control languages can be transmitted in accord with the forwarded-by-the-host-PC control language data having the request for data transmission added. In this manner, in addition to the effects described in the foregoing, even if the communication data determination part is incapable of determining the type of the requesting data, the printer language specifications setting data and the control language specifications setting data can be transmitted to the host information processor with any timing desired by the host information processor.

According to a ninth aspect, in the first aspect, the printer further comprises an error detection part for specifying, when an error is observed on the printer, a printer language command caused the error (hereinafter, referred to as error causing command), and a control language generation part for generating control language data in a predetermined format according to the error causing command for output to the bi-directional communication part.

According to a tenth aspect, in the second aspect, the printer further comprises an error detection part for specifying, when an error is observed on the printer, a control language command caused the error (error causing command), and a control language generation part for generating control language data in a predetermined format according to the error causing command for output to the bi-directional communication part.

As described above, in the ninth and tenth aspects, from the printer to the host information processor, the printer language specifications indicating the correspondence between the plot objects and the printer languages, or the control language specifications between the control elements and the control languages can be transmitted. Further, the host information processor can be notified of the error causing command which causes errors on the printer. In this manner, in addition to the effects described in the foregoing, the host information processor can be set not to use the error causing command after the notification, thereby successfully avoiding any error.

According to an eleventh aspect, in the first aspect, the printer further comprises an error detection part for specifying, when an error is observed on the printer, a printer language command causing the error (error causing command), and a language specifications update part for updating, according to the error causing command, the printer language specifications stored in the printer language specifications storage part to prevent the host information processor from using the error causing command.

According to a twelfth aspect, in the second aspect, the printer further comprises an error detection part for specifying, when an error is observed on the printer, a control language command causing the error (error causing command), and a language specifications update part for updating, according to the error causing command, the control language specifications stored in the control language specifications storage part to prevent the host information processor from using the error causing command.

As described above, in the eleventh and twelfth aspects, from the printer to the host information processor, the printer language specifications indicating the correspondence between the plot objects and the printer languages, or the control language specifications between the control elements and the control languages can be transmitted. Further, each of the language specifications is updated, as appropriate, so as to prevent the host information processor from using the error causing command which causes errors on the printer. In this manner, in addition to the effects described in the foregoing, the host information processor is set not to use the error causing command, thereby avoiding any error without effort.

According to a thirteenth aspect, in the third aspect,
the printer further comprises a printer settings change part for notifying the control language generation part of the details of setting change made by a user on the printer, wherein
the control language generation part generates the control language data indicating the notified details of setting change for output to the language specifications setting data transmission processing start part.

According to a fourteenth aspect, in the fourth aspect,
the printer further comprises a printer settings change part for notifying the control language generation part of the details of setting change made by a user on the printer, wherein
the control language generation part generates the control language data indicating the notified details of setting change for output to the language specifications setting data transmission processing start part.

According to a fifteenth aspect, in the eleventh aspect, the printer further comprises a printer settings change part for notifying the language specifications update part of the details of setting change made by a user on the printer, wherein
the language specifications update part updates the printer language specifications according to the notified details of setting change.

According to a sixteenth aspect, in the twelfth aspect, the printer further comprises a printer settings change part for notifying the language specifications update part of the details of setting change made by a user on the printer, wherein
the language specifications update part updates the printer language specifications according to the notified details of setting change.

According to a seventeenth aspect, in the third aspect,
the printer further comprises a device change detection part for notifying the control language generation part of the details of structural change made by a user on the printer, wherein
the control language generation part generates the control language data which indicates the notified details of structural change for output to the language specifications setting data transmission processing start part.

According to an eighteenth aspect, in the fourth aspect,
the printer further comprises a device change detection part for notifying the control language generation part of the details of structural change made by a user on the printer, wherein
the control language generation part generates the control language data which indicates the notified details of structural change for output to the language specifications setting data transmission processing start part.

According to a nineteenth aspect, in the eleventh aspect, the printer further comprises a device change detection part for notifying the language specifications update part of the details of structural change made by a user on the printer, wherein
the language specifications update part updates the printer language specifications according to the notified details of structural change.

According to a twentieth aspect, in the twelfth aspect,
the printer further comprises a device change detection part for notifying the language specifications update part of the details of structural change made by a user on the printer, wherein
the language specifications update part updates the printer language specifications according to the notified details of structural change.

As described above, in the thirteenth to twentieth aspects, from the printer to the host information processor, the printer language specifications indicating the correspondence between the plot objects and the printer languages, or the control language specifications between the control elements and the control languages can be transmitted. Further, the host information processor is notified of the details of the user's change made on the printer as to printer settings and constituents. In this manner, in addition to the effects described in the foregoing, in the host information processor, the descriptions of to-generate printer print data and printer control data can be changed in relation to such change made on the printer side.

A twenty-first aspect of the present invention is directed to a printer driver provided in a host information processor to be connected to a printer via a given communication medium, the printer driver comprising:
  a bi-directional communication part for receiving communication data from the printer;
  a communication data determination part for determining, under the control of an operating system operable on the host information processor, whether or not the communication data received by the bi-directional communication part is printer language specifications setting data which indicates a correspondence between a plot object forming application print data generated at printing by an application operable on the host information processor and a printer language for printing the plot object on the printer;
  a printer language specifications setting part for registering printer language specifications according to the printer language specifications setting data determined by the communication data determination part;
  a printer settings storage part for storing the printer language specifications according to the registration processing carried out by the printer language specifications setting part; and
  a printer language generation part for obtaining, according to the application print data at printing, the printer language corresponding to the plot object from the printer settings storage part to generate printer language print data for transmission to the printer via the bi-directional communication part.

A twenty-second aspect of the present invention is directed to a printer driver provided in a host information processor to be connected to a printer via a given communication medium, the printer driver comprising:
  a bi-directional communication part for receiving communication data from the printer;

a communication data determination part for determining, under the control of an operating system operable on the host information processor, whether or not the communication data received by the bi-directional communication part is control language specifications setting data which indicates a correspondence between a control element forming application print data generated at printing by an application operable on the host information processor and a control language for setting the control element on the printer;

a control language specifications setting part for registering control language specifications according to the control language specifications setting data determined by the communication data determination part;

a printer settings storage part for storing the control language specifications according to the registration processing carried out by the control language specifications setting part; and a control language generation part for obtaining, according to the application print data at printing, the control language corresponding to the control element from the printer settings storage part to generate control language print data for transmission to the printer via the bi-directional communication part.

As described above, in the twenty-first and twenty-second aspects, the descriptions in the printer settings storage part are automatically set (updated) according to the printer language specifications setting data or the control language specifications setting data provided from the printer. In this manner, without the user's concern for the type of printer languages or the version thereof supportable by the printer, the host information processor can always generate print data written in usable language on the printer connected thereto. Therefore, even if a plurality of printers are in use, printing in an optimal manner is always promised, and the storage resources can be utilized.

According to a twenty-third aspect, in the twenty-first aspect, the printer driver further comprises a control language interpretation part for further interpreting the predetermined control language data determined by the communication data determination part, wherein when the printer language specifications setting data is in a format of the control language data, the control language interpretation part instructs the printer language specifications setting part to register the printer language specifications.

According to a twenty-fourth aspect, in the twenty-second aspect, the printer driver further comprises a control language interpretation part for further interpreting the predetermined control language data determined by the communication data determination part, wherein when the control language specifications setting data is in a format of the control language data, the control language interpretation part instructs the control language specifications setting part to register the control language specifications.

As described above, in the twenty-third and twenty-fourth aspects, the descriptions in the printer settings storage part are automatically set (updated) according to the printer language specifications setting data or the control language specifications setting data provided from the printer as control language data. In this manner, in addition to the effects described in the foregoing, even if being incapable of directly receiving the printer language specifications setting data and the control language specifications setting data, the printer driver can always generate print data in usable language on the printer connected thereto.

According to a twenty-fifth aspect, in the twenty-first aspect, the printer driver further comprises a printer setting data request generation part for generating requesting data asking the printer for transmission of the printer language specifications setting data, and transmitting the same to the bi-directional communication part.

According to a twenty-sixth aspect, in the twenty-second aspect, the printer driver further comprises a printer setting data request generation part for generating requesting data asking the printer for transmission of the control language specifications setting, and transmitting the same to the bi-directional communication part.

As described above, in the twenty-fifth and twenty-sixth aspects, the printer language specifications setting data or the control language specifications setting data for automatically setting (updating) the descriptions in the printer settings storage part is requested to the printer with an arbitrary timing. In this manner, in addition to the effects described in the foregoing, there is no more need to continuously monitor the printer language specifications setting data and the control language specifications setting data, thereby cutting down overheads thereof.

According to a twenty-seventh aspect, in the twenty-first aspect, the printer language specifications stored in the printer settings storage part are provided with, in addition to the correspondence between the plot object and the printer language, link information indicating whether or not there is an other plot object being equivalent in drawing to the plot object, a printer error information registration part for registering in the printer settings storage part, according to a printer language command causing an error observed on the printer (error causing command), printer error information which indicates a plot object using the error causing command causing an error at printing is further provided, and the printer language generation part refers to the printer error information and the link information stored in the printer settings storage part, and then replaces the plot object causing the error on the printer with an other plot object linked thereto for generation of the printer language print data.

According to a twenty-eighth aspect, in the twenty-second aspect, the control language specifications stored in the printer settings storage part are provided with, in addition to the correspondence between the control element and the control language, link information indicating whether or not there is an other control element being equivalent to the control element, a printer error information registration part for registering in the printer settings storage part, according to a control language command causing an error observed on the printer (error causing command), printer error information which indicates a control element using the error causing command causing an error at printing is further provided, and the control language generation part refers to the printer error information and the link information stored in the printer settings storage part, and then replaces the control element causing the error on the printer with an other control element linked thereto for generation of the control language print data.

As described above, in the twenty-seventh and twenty-eighth aspects, the descriptions in the printer settings storage part are automatically set (updated) according to the printer language specifications setting data or the control language specifications setting data provided from the printer. In addition thereto, the plot objects and the control elements (language commands) causing errors on the printer are stored in the printer settings storage part. In this manner, in addition to the effects described in the foregoing, it becomes possible to generate print data which use no language command causing errors on the printer, thereby successfully avoiding any printing error on the printer.

According to a twenty-ninth aspect, in the twenty-seventh aspect,
when the printer error information is provided from the printer, the communication data determination part further determines the printer error information received via the bi-directional communication part for output to the printer error information registration part.

According to a thirtieth aspect, in the twenty-eighth aspect,
when the printer error information is provided from the printer, the communication data determination part further determines the printer error information received via the bi-directional communication part for output to the printer error information registration part.

As described above, in the twenty-ninth and thirtieth aspects, the descriptions in the printer settings storage part are automatically set (updated) according to the printer language specifications setting data or the control language specifications setting data provided from the printer. In addition thereto, the plot objects and the control elements (language commands) causing errors on the printer are stored in the printer settings storage part according to the error information provided from the printer. In this manner, in addition to the effects described in the foregoing, it becomes possible to generate print data which use no language command causing errors on the printer without the user's intervention, thereby successfully avoiding any printing error on the printer without being noticed by the user.

According to a thirty-first aspect, in the twenty-ninth aspect,
when the printer error information provided from the printer is in the format of the control language data, the control language interpretation part further interprets the control language data to extract the printer error information therefrom for output to the printer error information registration part.

According to a thirty-second aspect, in the thirtieth aspect,
when the printer error information provided from the printer is in the format of the control language data, the control language interpretation part further interprets the control language data to extract the printer error information therefrom for output to the printer error information registration part.

As described above, in the thirty-first and thirty-second aspects, the descriptions in the printer settings storage part are automatically set (updated) according to the printer language specifications setting data or the control language specifications setting data provided from the printer. In addition thereto, according to the error information provided from the printer in the format of the control language data, the plot objects and the control elements (language commands) causing errors on the printer are automatically stored in the printer settings storage part. In this manner, in addition to the effects described in the foregoing, even when the printer error information cannot be directly received, it becomes possible to generate print data which use no language command causing errors on the printer without the user's intervention, thereby successfully avoiding any printing error on the printer without being noticed by the user.

According to a thirty-third aspect, in the twenty-first aspect,
the printer driver further comprises a data for printer settings display generation part, when information in the printer settings storage part is set or updated, for reading the information to generate display data corresponding thereto, and
a printer settings display part for performing information display by means of an arbitrary display medium according to the display data generated by the data for printer settings display generation part.

According to a thirty-fourth aspect, in the twenty-second aspect,
the printer driver further comprises a data for printer settings display generation part, when information in the printer settings storage part is set or updated, for reading the information to generate display data corresponding thereto, and
a printer settings display part for performing information display by means of an arbitrary display medium according to the display data generated by the data for printer settings display generation part.

As described above, in the thirty-third and thirty-fourth aspects, the descriptions in the printer settings storage part are automatically set (updated) according to the printer language specifications setting data or the control language specifications setting data provided from the printer. In addition thereto, the set (updated) descriptions are displayed for the user. In this manner, in addition to the effects described in the foregoing, the user is appropriately notified of the printer settings or the descriptions of the error caused on the printer. Therefore, the user can always confirm the automatically-set descriptions and can deal with the error properly and promptly not to increase the damage (secondary damage).

A thirty-fifth aspect of the present invention is directed to a recording medium on which a printer driver program to be run on a computer device is recorded for realizing an operational environment on the computer device, the program comprising the steps of:
receiving communication data from a printer;
determining, under the control of an operating system operable on a host information processor, whether or not the communication data is printer language specifications setting data which indicates a correspondence between a plot object forming application print data generated at printing by an application operable on the host information processor and a printer language for printing the plot object on the printer;
registering printer language specifications according to the determined printer language specifications setting data; and
generating, with the application print data at printing, printer language print data for transmission to the printer according to the printer language corresponding to the registered plot object.

A thirty-sixth aspect of the present invention is directed to a recording medium on which a printer driver program to be run on a computer device is recorded for realizing an operational environment on the computer device, the program comprising the steps of:

receiving communication data from a printer;

determining, under the control of an operating system operable on a host information processor, whether or not the communication data is control language specifications setting data which indicates a correspondence between a control element forming application print data generated at printing by an application operable on the host information processor and a control language for setting the control element on the printer;

registering control language specifications according to the determined control language specifications setting data; and generating, with the application print data at printing, control language print data for transmission to the printer according to the correspondence between the registered control element and the control language.

According to a thirty-seventh aspect, in the thirty-fifth aspect, the program recorded on the recording medium further comprises the step of further interpreting the predetermined control language data determined in the determination step, wherein when the printer language specifications setting data is in a format of the control language data, the printer language specifications is registered in the interpretation step.

According to a thirty-eighth aspect, in the thirty-sixth aspect, the program recorded on the recording medium further comprises the step of further interpreting the predetermined control language data determined in the determination step, wherein when the control language specifications setting data is in a format of the control language data, the control language specifications is registered in the interpretation step.

According to a thirty-ninth aspect, in the thirty-fifth aspect, the program recorded on the recording medium further comprises the step of generating and transmitting requesting data asking the printer for transmission of the printer language specifications setting data.

According to a fortieth aspect, in the thirty-sixth aspect, the program recorded on the recording medium further comprises the step of generating and transmitting requesting data asking the printer for transmission of the control language specifications setting data.

According to a forty-first aspect, in the thirty-fifth aspect, the registered printer language specifications are provided, in addition to the correspondence between the plot object and the printer language, with link information which indicates whether or not there is an other plot object being equivalent in drawing to the plot object, the step of registering, according to a printer language command causing an error observed on the printer (error causing command), printer error information which indicates that a plot object using the error causing command causes an error at printing is further provided, and in the generation step, the registered printer error information and the link information are referred to, and then the plot object causing the error on the printer is replaced with an other plot object linked thereto to generate the printer language print data.

According to a forty-second aspect, in the thirty-sixth aspect, the registered control language specifications is provided, in addition to the correspondence between the control element and the control language, with link information which indicates whether or not there is an other control element being equivalent to the control element, the step of registering, according to a control language command causing an error observed on the printer (error causing command), printer error information which indicates a control element using the error causing command causing an error at printing is further provided, and in the generation step, the registered printer error information and the link information are referred to, and then the control element causing the error on the printer is replaced with an other control element linked thereto to generate the control language print data.

According to a forty-third aspect, in the forty-first aspect, when the printer error information is provided from the printer, in the determination step, the printer error information is further determined.

According to a forty-fourth aspect, in the forty-second aspect, when the printer error information is provided from the printer, in the determination step, the printer error information is further determined.

According to a forty-fifth aspect, in the forty-third aspect, when the printer error information provided from the printer is in the format of the control language data, in the interpretation step, the control language data is further interpreted to extract the printer error information therefrom.

According to a forty-sixth aspect, in the forty-fourth aspect, when the printer error information provided from the printer is in the format of the control language data, in the interpretation step, the control language data is further interpreted to extract the printer error information therefrom.

According to a forty-seventh aspect, in the thirty-fifth aspect, the program recorded on the recording medium further comprises the steps of:

generating, when the registered information is set or updated, display data corresponding to the information after reading the same as appropriate; and performing information display by means of an arbitrary display medium according to the display data.

According to a forty-eighth aspect, in the thirty-sixth aspect, the program recorded on the recording medium further comprises the steps of:

generating, when the registered information is set or updated, display data corresponding to the information after reading the same as appropriate; and performing information display by means of an arbitrary display medium according to the display data.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing the structure of a printer according to a first embodiment of the present invention;

FIG. 2 is an exemplary table specifically showing printer language specifications stored in a printer language specifications storage part 101 in FIG. 1;

FIG. 4 is an exemplary table specifically showing control language specifications stored in a control language specifications storage part 103 in FIG. 1;

FIG. 17 is an exemplary table specifically showing printer language setting data stored in a printer settings storage part 1206 in FIG. 16;

FIG. 18 is an exemplary table specifically showing control language setting data stored in the printer settings storage part 1206 in FIG. 16;

FIGS. 19(a)–(c) are diagrams illustrating an exemplary method of drawing a plot object when any error is observed;

FIG. 23 is a diagram showing an exemplary printer settings display screen in a printer settings display part 1512 in FIG. 22.

DESCRIPTION OF THE PREFERRED EMBODIMENTS

Figure 3:
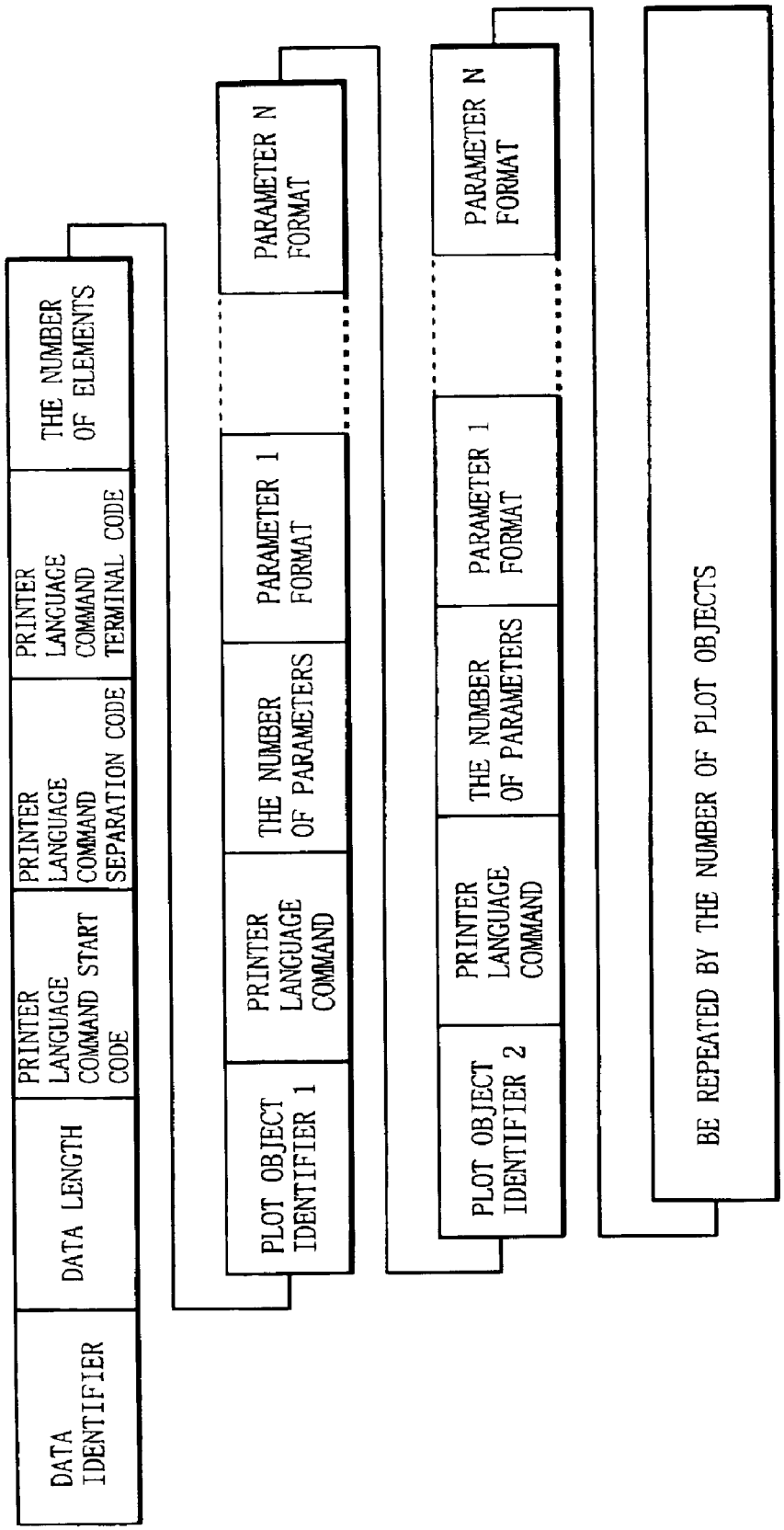
FIG. 3 is a diagram showing an exemplary format of printer language specifications setting data to be generated in a printer language specifications setting data generation part 102 in FIG. 1.

Effects of the present invention are effectively utilized in conjunction with a printer which provides information relevant to its own printer language specifications and control language specifications, and a printer driver which automatically makes settings (setting-up) necessary for printing according to the information provided from the printer.

Herein, such printer and printer driver are each varied in structure, and can flexibly be combined with each other for realization of the present invention. Therefore, the printer and the printer driver are separately described in the following embodiments.

(First Embodiment)

FIG. 1 is a block diagram showing the structure of a printer according to a first embodiment of the present invention. In FIG. 1, a printer 100 of the first embodiment is provided with a printer language specifications storage part 101, a printer language specifications setting data generation part 102, a control language specifications storage part 103, a control language specifications setting data generation part 104, a language specifications setting data transmission processing start part 105, a bi-directional communication part 106, a communication data determination part 107, a control language interpretation part 108, a printer status storage part 109, a control language generation part 110, an image generation control part 111, and a printer engine 112.

Figure 5:
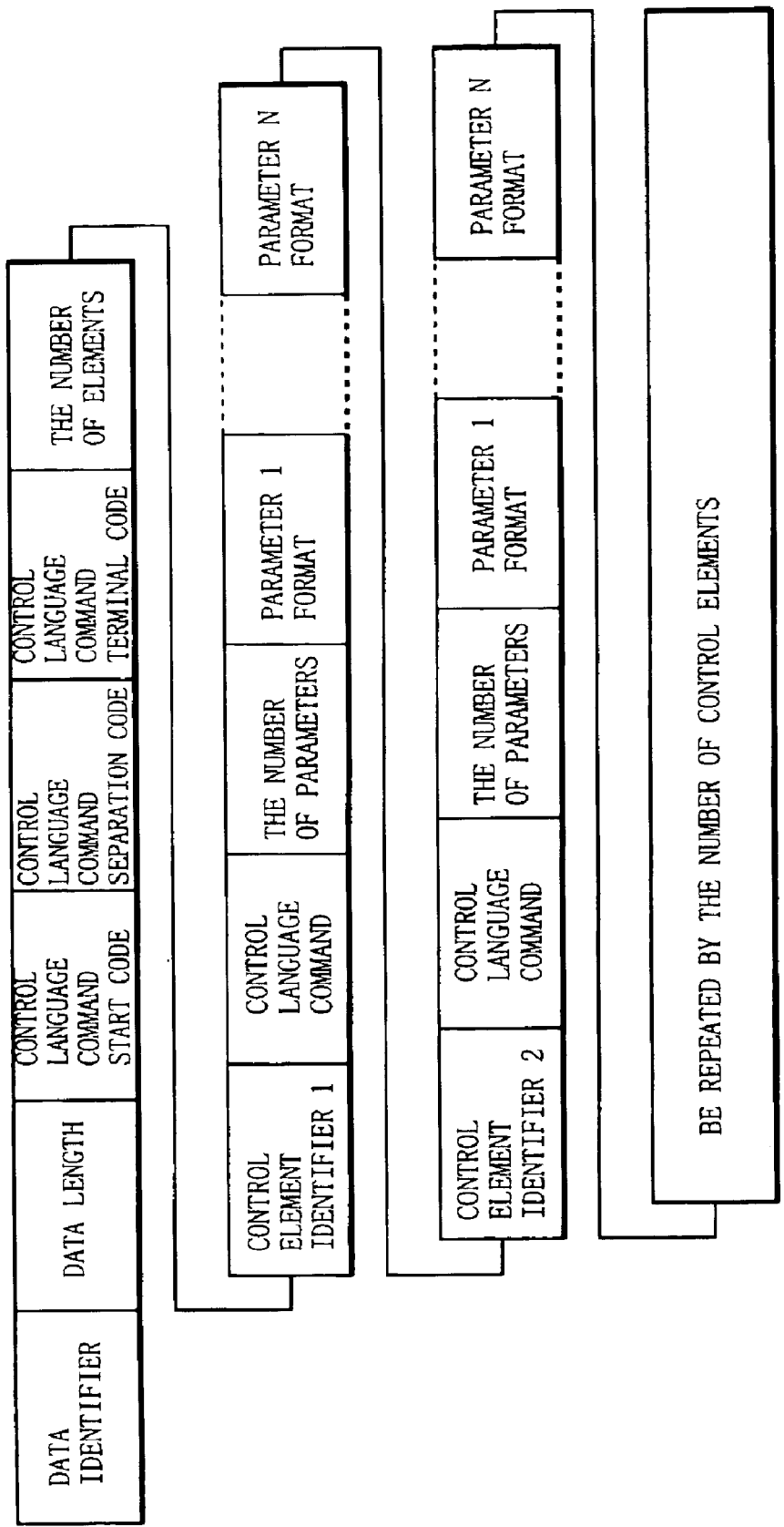
FIG. 5 is a diagram showing an exemplary format of control language specifications setting data to be generated in a control language specifications setting data generation part 104 in FIG. 1.

FIG. 2 is an exemplary table specifically showing printer language specifications stored in the printer language specifications storage part 101 in FIG. 1. FIG. 3 is a diagram showing an exemplary format of printer language specifications setting data to be generated in the printer language specifications setting data generation part 102 in FIG. 1. FIG. 4 is an exemplary table specifically showing control language specifications stored in the control language specifications storage part 103 in FIG. 1. FIG. 5 is a diagram showing an exemplary format of control language specifications setting data to be generated in the control language specifications setting data generation part 104 in FIG. 1.

Hereinafter, by referring to FIGS. 1 to 5, it is described how the respective constituents of the printer 100 of the first embodiment are operated.

The printer language specifications storage part 101 stores printer language specifications, which indicate the correspondence between plot objects including graphics, e.g., dot, line, rectangle or circle, and text (in application print data provided from a host PC) and printer languages for printing the plot objects on the printer 100. For instance, FIG. 2 shows that a command for a plot object "circle" is "CIRCLE" and an instruction format thereof is in order of "command, center X coordinate, center Y coordinate, radium".

The printer language specifications setting data generation part 102 reads the printer language specifications from the printer language specifications storage part 101, and generates to-be-transmitted-to-the-host-PC printer language specifications setting data in accord with the predetermined data format shown in FIG. 3 for output to the language specifications setting data transmission processing start part 105.

The control language specifications storage part 103 stores control language specifications, which indicate the correspondence between control elements (in the application print data provided from the host PC) and control languages for setting the details of the control elements to the printer 100. The control elements are related to device control, e.g., selection of input/output trays or instruction as to toner concentration, inquiries about online/offline, job processing, availability of perfecting press unit, or internally-provided memory capacity, and final touch settings, e.g., selection of printing paper, instructions as to the number of copies or enlarging/reducing. For instance, FIG. 4 shows that a command for a control element "input tray (selection thereof)" is "INPUTTRAY" and an instruction format thereof is in order of "command, tray number".

The control language specifications setting data generation part 104 reads the control language specifications from the control language specifications storage part 103, and generates to-be-transmitted-to-the-host-PC control language specifications setting data in accord with the predetermined data format shown in FIG. 5 for output to the language specifications setting data transmission processing start part 105.

The language specifications setting data transmission processing start part 105 transmits, to the bi-directional communication part 106, the printer language specifications setting data generated in the printer language specifications setting data generation part 102 and/or the control language specifications setting data generated in the control language specifications setting data generation part 104 in accord with a separately provided trigger giving an instruction to start transmission to the host PC.

The bi-directional communication part 106 transmits, to the host PC through a transmission path, the printer language specifications setting data and/or the control language specifications setting data received from the language specifications setting data transmission processing start part 105. The bi-directional communication part 106 also transmits, to the host PC through the transmission path, control language data received from the later-described control language generation part 110.

Similarly to the conventional printer 3000 in the foregoing, the bi-directional communication part 106 (3006) receives communication data from the host PC for output to the communication data determination part 107 (3007). The communication data determination part 107 receives the communication data from the bi-directional communication part 106 so as to determine whether the data is the printer language print data or the control language print data. If the data is determined as being the printer language print data, the communication data determination part 107 forwards the data to the image generation control part 111 (3011), otherwise to the control language interpretation part 108 (3008). The printer status storage part 109 (3009) stores current status of the printer 100 for every setting. The control language interpretation part 108 interprets the communication data provided from the communication data determination part 107, i.e., the control language print data, and then outputs information (response) relevant to the descriptions thereof to the control language generation part 100 (3010) directly or via the printer status storage part 109. The control language generation part 110 converts the information received from the control language interpretation part 108 or the printer status storage part 109 into control language data in a predetermined format for output to the bi-directional communication part 106. The image generation control part 111 (3011) interprets the communication data provided from the communication data determination part 107, i.e., the printer language print data, and then controls the printer engine 112 (3012) in accord with the descriptions thereof. The printer engine 112 is a mechanism to execute a print job onto paper, and prints the plot objects under the control of the image generation control part 111.

As is known from the above, according to the printer of the first embodiment, from the printer to the host PC, the printer language specifications indicating the correspondence between the plot objects and the printer languages, and the control language specifications between the control elements and the control languages can be transmitted.

In this manner, if the host PC (printer driver thereof) is capable of receiving the printer language specifications setting data and the control language specifications setting data, the host PC can automatically set (install or set-up) the printer language and the control language, without the user's intervention, only by connecting the printer thereto.

(Second Embodiment)

Figure 6:
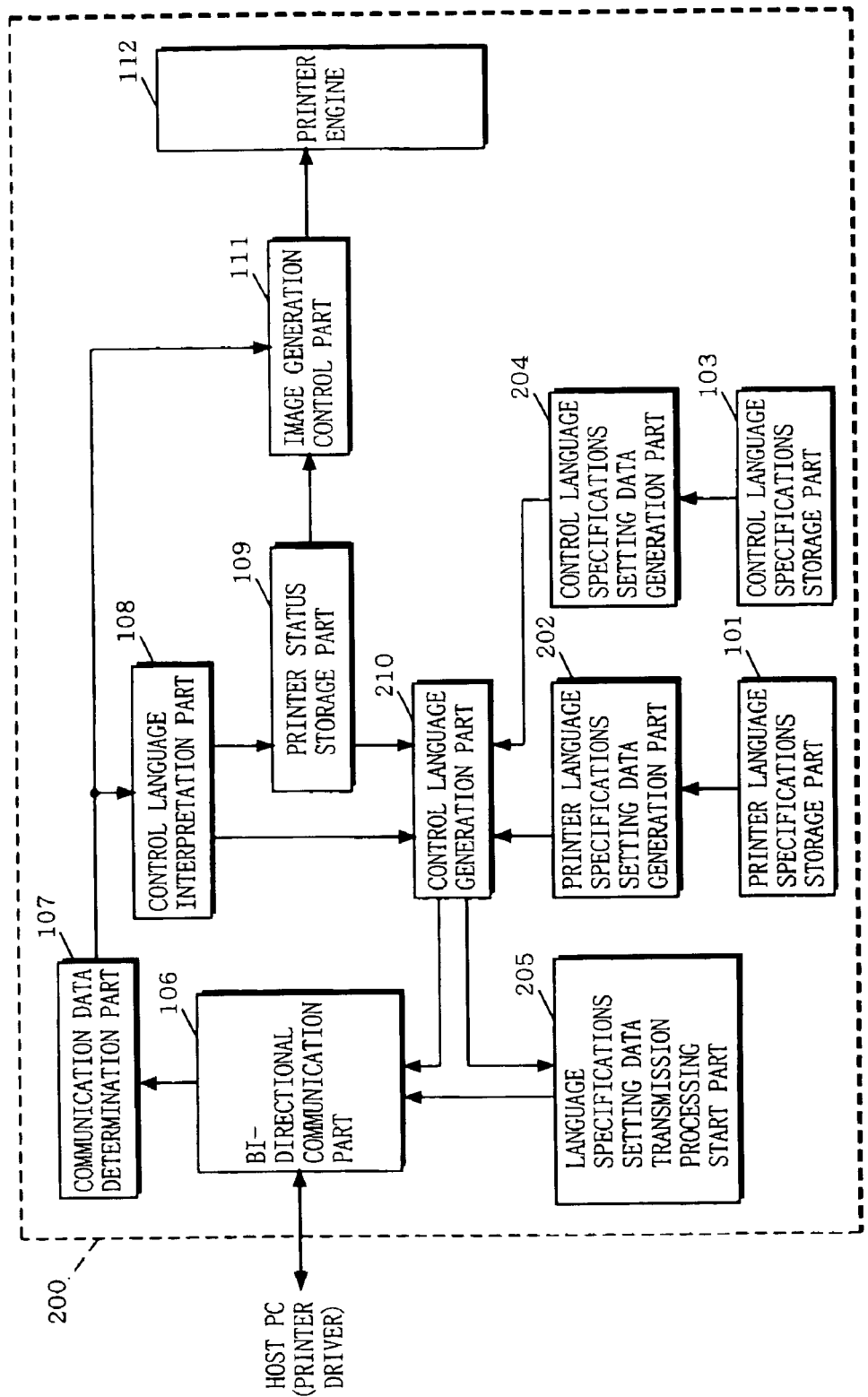
FIG. 6 is a block diagram showing the structure of a printer according to a second embodiment of the present invention.

FIG. 6 is a block diagram showing the structure of a printer according to a second embodiment of the present invention. In FIG. 6, a printer 200 of the second embodiment is provided with the printer language specifications storage part 101, a printer language specifications setting data generation part 202, the control language specifications storage part 103, a control language specifications setting data generation part 204, a language specifications setting data transmission processing start part 205, the bi-directional communication part 106, the communication data determination part 107, the control language interpretation part 108, the printer status storage part 109, a control language generation part 210, the image generation control part 111, and the printer engine 112.

As shown in FIG. 6, the printer 200 of the second embodiment is provided with the printer language specifications setting data generation part 202, the control language specifications setting data generation part 204, the language specifications setting data transmission processing start part 205, and the control language generation part 210 as alternatives to the printer language specifications setting data generation part 102, the control language specifications setting data generation part 104, the language specifications setting data transmission processing start part 105, and the control language generation part 110 found in the printer 100 of the first embodiment. Herein, other constituents of the printer 200 are identical to those of the printer 100, therefore being under the same reference numerals and not further described.

Hereinafter, by referring to FIG. 6, it is described how the respective constituents of the printer 200 of the second embodiment are operated, more focused on the constituents that differ from those of the printer 100 of the first embodiment.

The printer language specifications setting data generation part 202 reads printer language specifications from the printer language specifications storage part 101, and generates to-be-transmitted-to-the-host-PC printer language specifications setting data in accord with the predetermined data format (see FIG. 3) for output to the control language generation part 210.

The control language specifications setting data generation part 204 reads control language specifications from the control language specifications storage part 103, and generates to-be-transmitted-to-the-host-PC control language specifications setting data in accord with the predetermined data format (see FIG. 5) for output to the control language generation part 210.

The control language generation part 210 converts information provided from the control language interpretation part 108 or the printer status storage part 109 into control language data in a predetermined format for output to the bi-directional communication part 106. The control language generation part 210 also receives the printer language specifications setting data generated in the printer language specifications setting data generation part 202 and/or the control language specifications setting data generated in the control language specifications setting data generation part 204, and then, according thereto, generates control language data formed by information relevant to the printer language specifications and/or the control language specifications for output to the language specifications setting data transmission processing start part 205.

The language specifications setting data transmission processing start part 205 transmits, to the bi-directional communication part 106, the control language data generated in the control language generation part 210 in accord with a separately provided trigger giving an instruction to start transmission to the host PC.

Note that, the control language generation part 210 may add information on the printer language specifications setting data and/or the control language specifications setting data to the control language data generated according to the information received from the control language interpretation part 108 or the printer status storage part 109 for direct output to the bi-directional communication part 106.

Herein, a data identifier of the control language data formed only by the control language is preferably set not to be identical to a data identifier of the control language data to which the printer language specifications and/or the control language specifications are added. This accordingly makes the host PC easy to distinguish data.

As is known from the above, according to the printer of the second embodiment, the printer language specifications indicating the correspondence between the plot objects and the printer languages, and the control language specifications between the control elements and the control languages can be added to the control language data for transmission from the printer to the host PC.

In this manner, with the control language data, even if the host PC (printer driver thereof) is incapable of receiving the printer language specifications setting data and the control language specifications setting data, the host PC can automatically set (install or set-up) the printer language and the control language, without the user's intervention, only by connecting the printer thereto.

(Third Embodiment)

Figure 7:
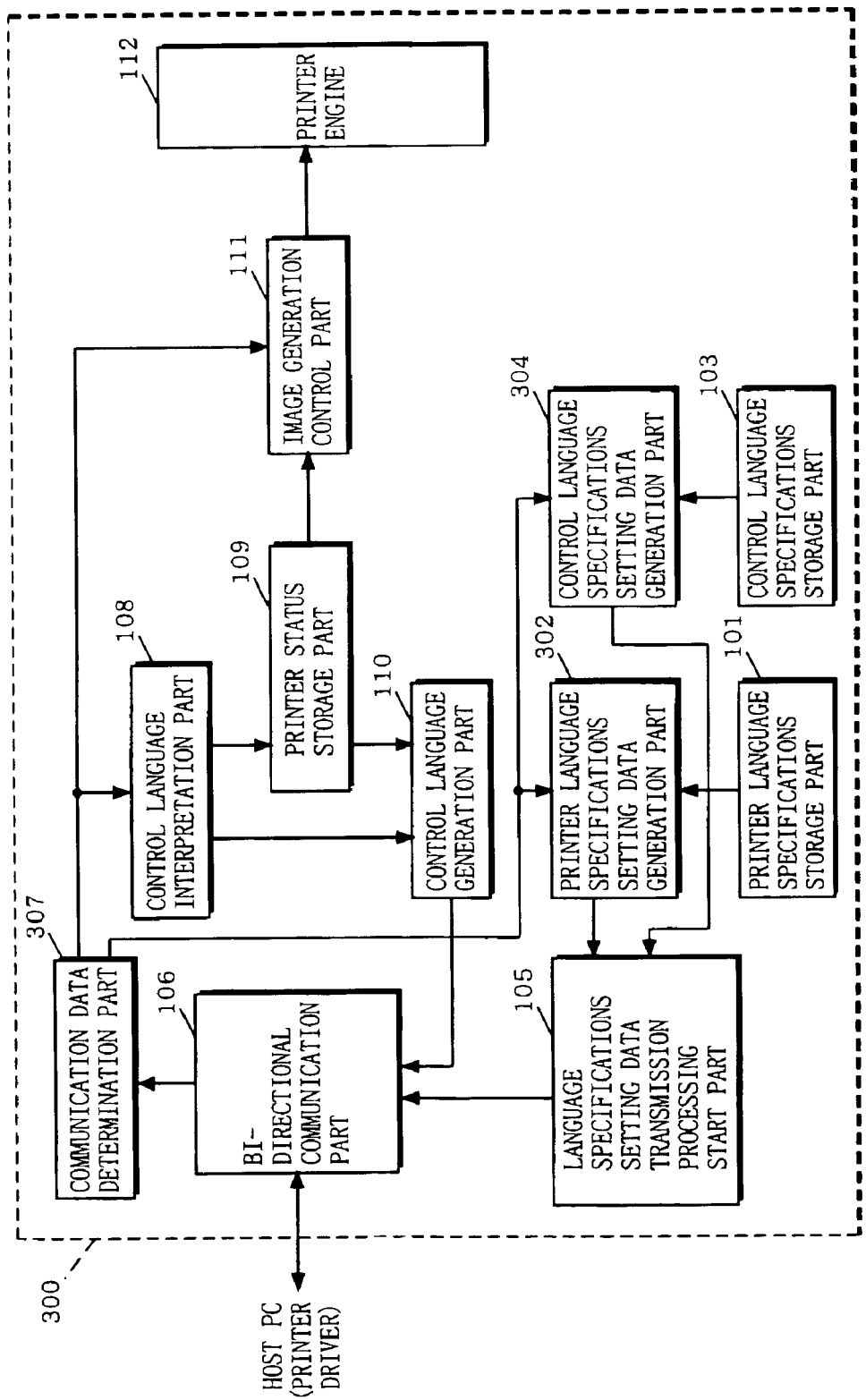
FIG. 7 is a block diagram showing the structure of a printer according to a third embodiment of the present invention.

FIG. 7 is a block diagram showing the structure of a printer according to a third embodiment of the present invention. In FIG. 7, a printer 300 of the third embodiment is provided with the printer language specifications storage part 101, a printer language specifications setting data generation part 302, the control language specifications storage part 103, a control language specifications setting data generation part 304, the language specifications setting data transmission processing start part 105, the bi-directional communication part 106, a communication data determination part 307, the control language interpretation part 108, the printer status storage part 109, the control language generation part 110, the image generation control part 111, and the printer engine 112.

As shown in FIG. 7, the printer 300 of the third embodiment is provided with the printer language specifications setting data generation part 302, the control language specifications setting data generation part 304, and the communication data determination part 307 as alternatives to the printer language specifications setting data generation part 102, the control language specifications setting data generation part 104, and the communication data determination part 107 found in the printer 100 of the first embodiment. Herein, other constituents of the printer 300 are identical to those of the printer 100, therefore being under the same reference numerals and not further described.

Hereinafter, by referring to FIG. 7, it is described how the respective constituents of the printer 300 of the third embodiment are operated, more focused on the constituents that differ from those of the printer 100 of the first embodiment.

Herein, the host PC is presumably capable of receiving printer language specifications setting data and control language specifications setting data provided from the printer 300, and also is capable of transmitting communication data asking for data transmission of at least either the printer language specifications or the control language specifications with an arbitrary timing (hereinafter, referred to as requesting data). The arbitrary timing herein may be when the host PC is booted, when the user makes any designation on a setting screen of an application or a printer driver, or when reboot of the printer is detected.

On receiving requesting data from the host PC as communication data, the printer 300 is operated in the following manner.

The communication data determination part 307 receives requesting data from the host PC via the bi-directional communication part 106, and then determines the type of the requesting data by referring to the data identifier thereof, for example. If the requesting data is determined as asking for data transmission of the printer language specifications, the communication data determination part 307 instructs the printer language specifications setting data generation part 302 to start generating data (provides a trigger), otherwise instructs the control language specifications setting data generation part 304 in the same manner. As is already described in the foregoing, the communication data determination part 307 forwards the communication data to the image generation control part 111 if the data is determined as being the printer language data, and otherwise to the control language interpretation part 108.

With the timing instructed by the communication data determination part 307, the printer language specifications setting data generation part 302 reads the printer language specifications from the printer language specifications storage part 101, and then generates to-be-transmitted-to-the-host-PC printer language specifications setting data in accord with the predetermined data format (see FIG. 3) for output to the language specifications setting data transmission processing start part 105.

Also, with the timing instructed by the communication data determination part 307, the control language specifications setting data generation part 304 reads the control language specifications from the control language specifications storage part 103, and then generates to-be-transmitted-to-the-host-PC control language specifications setting data in accord with the predetermined data format (see FIG. 5) for output to the language specifications setting data transmission processing start part 105.

As is known from the above, according to the printer of the third embodiment, from the printer to the host PC, the printer language specifications indicating the correspondence between the plot objects and the printer languages, and the control language specifications between the control elements and the control languages can be transmitted in accord with the requesting data provided from the host PC.

In this manner, in addition to the effects described in the foregoing, overhead of continuously monitoring setting data on the host PC can be cut down. Further, with any timing desired by the host PC (e.g., at rebooting), the printer language specifications setting data and the control language specifications setting data can be transmitted to the host PC.

In the third embodiment, although the structure of the communication data determination part 307 is exemplarily adopted to the printer 100 of the first embodiment, the structure thereof may be adopted to the printer 200 of the second embodiment. If this is the case, the printer language specifications setting data generation part 202 and the control language specifications setting data generation part 204 in the second embodiment are to generate data with a timing instructed by the communication data determination part 307.

(Fourth Embodiment)

Figure 8:
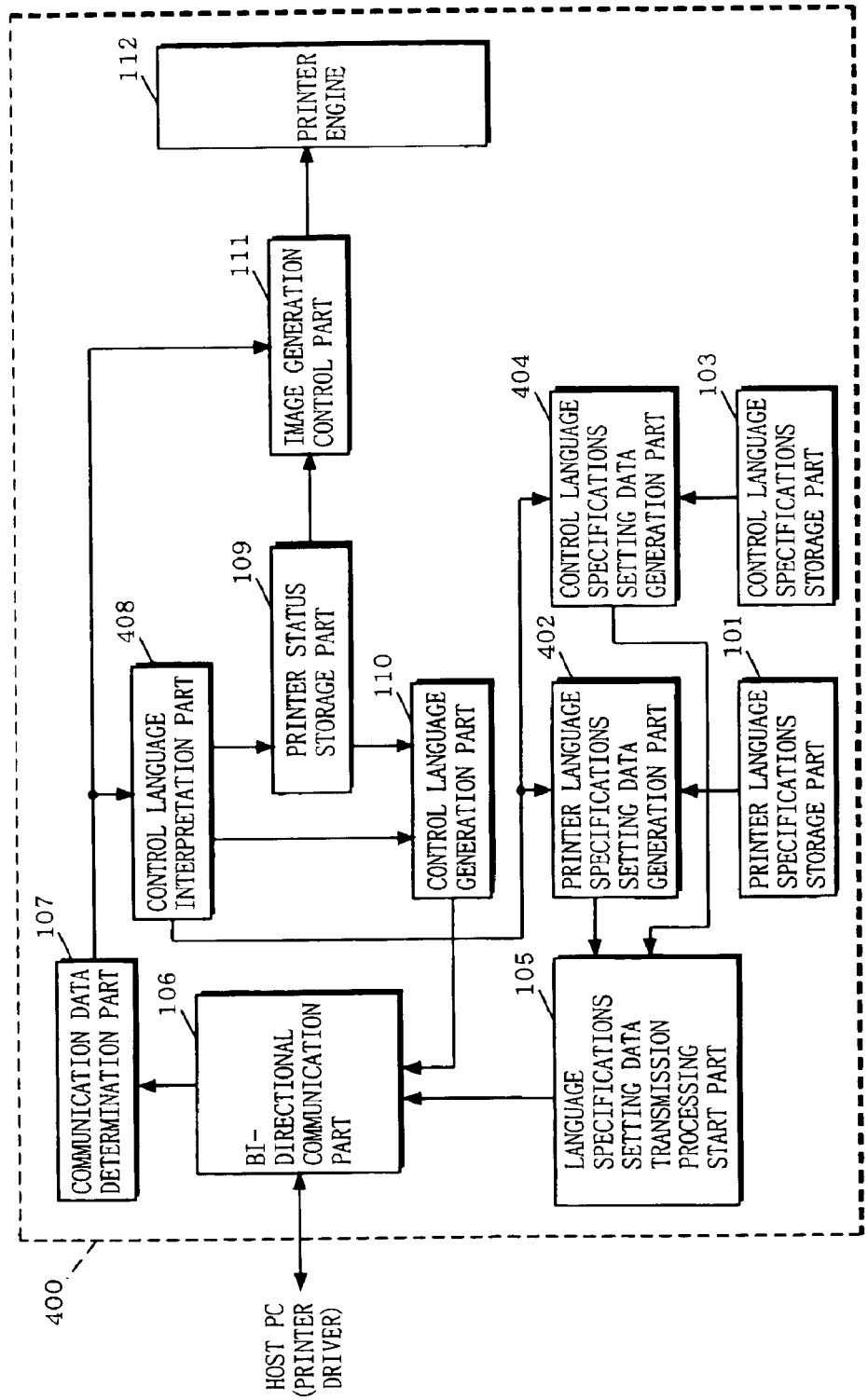
FIG. 8 is a block diagram showing the structure of a printer according to a fourth embodiment of the present invention.

FIG. 8 is a block diagram showing the structure of a printer according to a fourth embodiment of the present invention. In FIG. 8, a printer 400 of the fourth embodiment is provided with the printer language specifications storage part 101, a printer language specifications setting data generation part 402, the control language specifications storage part 103, a control language specifications setting data generation part 404, the language specifications setting data transmission processing start part 105, the bi-directional communication part 106, the communication data determination part 107, a control language interpretation part 408, the printer status storage part 109, the control language generation part 110, the image generation control part 111, and the printer engine 112.

As shown in FIG. 8, the printer 400 of the fourth embodiment is provided with the printer language specifications setting data generation part 402, the control language specifications setting data generation part 404, and the control language interpretation part 408 as alternatives to the printer language specifications setting data generation part 102, the control language specifications setting data generation part 104, and the control language interpretation part 108 found in the printer 100 of the first embodiment. Herein, other constituents of the printer 400 are identical to those of the printer 100, therefore being under the same reference numerals and not further described.

Hereinafter, by referring to FIG. 8, it is described how the respective constituents of the printer 400 of the fourth embodiment are operated, more focused on the constituents that differ from those of the printer 100 of the first embodiment.

Herein, the host PC is presumably capable of receiving printer language specifications setting data and control language specifications setting data provided from the printer 400, and also is capable of transmitting a request for data transmission of at least either the printer language specifications or the control language specifications with an arbitrary timing along with the control language data. The arbitrary timing herein may be the same as described in the third embodiment.

On receiving control language data along with a request for data transmission as communication data from the host PC, the printer 400 is operated in the following manner.

As is already described in the foregoing, the communication data determination part 107 forwards the received communication data to the image generation control part 111 if the data is determined as being the printer language data, otherwise to the control language interpretation part 408.

The control language interpretation part 408 further interprets the control language data by referring to the data identifier thereof, for example, If the data is interpreted as including any request for data transmission of the printer language specifications, the control language interpretation part 408 instructs the printer language specifications setting data generation part 402 to start generating data (provides a trigger), otherwise instructs the control language specifications setting data generation part 404 in the same manner. As is already described in the foregoing, the control language interpretation part 408 forwards information relevant to the typical control language data to the control language generation part 110 directly or via the printer status storage part 109.

With the timing instructed by the control language interpretation part 408, the printer language specifications setting data generation part 402 reads the printer language specifications from the printer language specifications storage part 101, and then generates to-be-transmitted-to-the-host-PC printer language specifications setting data in accord with the predetermined data format (see FIG. 3) for output to the language specifications setting data transmission processing start part 105.

Also, with the timing instructed by the control language interpretation part 408, the control language specifications setting data generation part 404 reads the control language specifications from the control language specifications storage part 103, and then generates to-be-transmitted-to-the-host-PC control language specifications setting data in accord with the predetermined data format (see FIG. 5) for output to the language specifications setting data transmission processing start part 105.

As is known from the above, according to the printer 400 of the forth embodiment, from the printer to the host PC, the printer language specifications indicating the correspondence between the plot objects and the printer languages, and the control language specifications between the control elements and the control languages can be transmitted in accord with the forwarded-by-the-host-PC control language data having the request for data transmission added.

In this manner, in addition to the effects described in the foregoing, even if the communication data determination part is incapable of determining the type of the requesting data, the printer language specifications setting data and the control language specifications setting data can be transmitted to the host PC with any timing desired by the host PC.

In the fourth embodiment, although the structure of the control language interpretation part 408 is exemplarily adopted to the printer 100 of the first embodiment, the structure thereof may be adopted to the printers 200 and 300 of the second and third embodiments. If this is the case, the printer language specifications setting data generation parts 202 and 302, and the control language specifications setting data generation parts 204 and 304 in the second and third embodiments are to respectively generate language specifications setting data with a timing instructed by the control language interpretation part 408.

(Fifth Embodiment)

Figure 9:
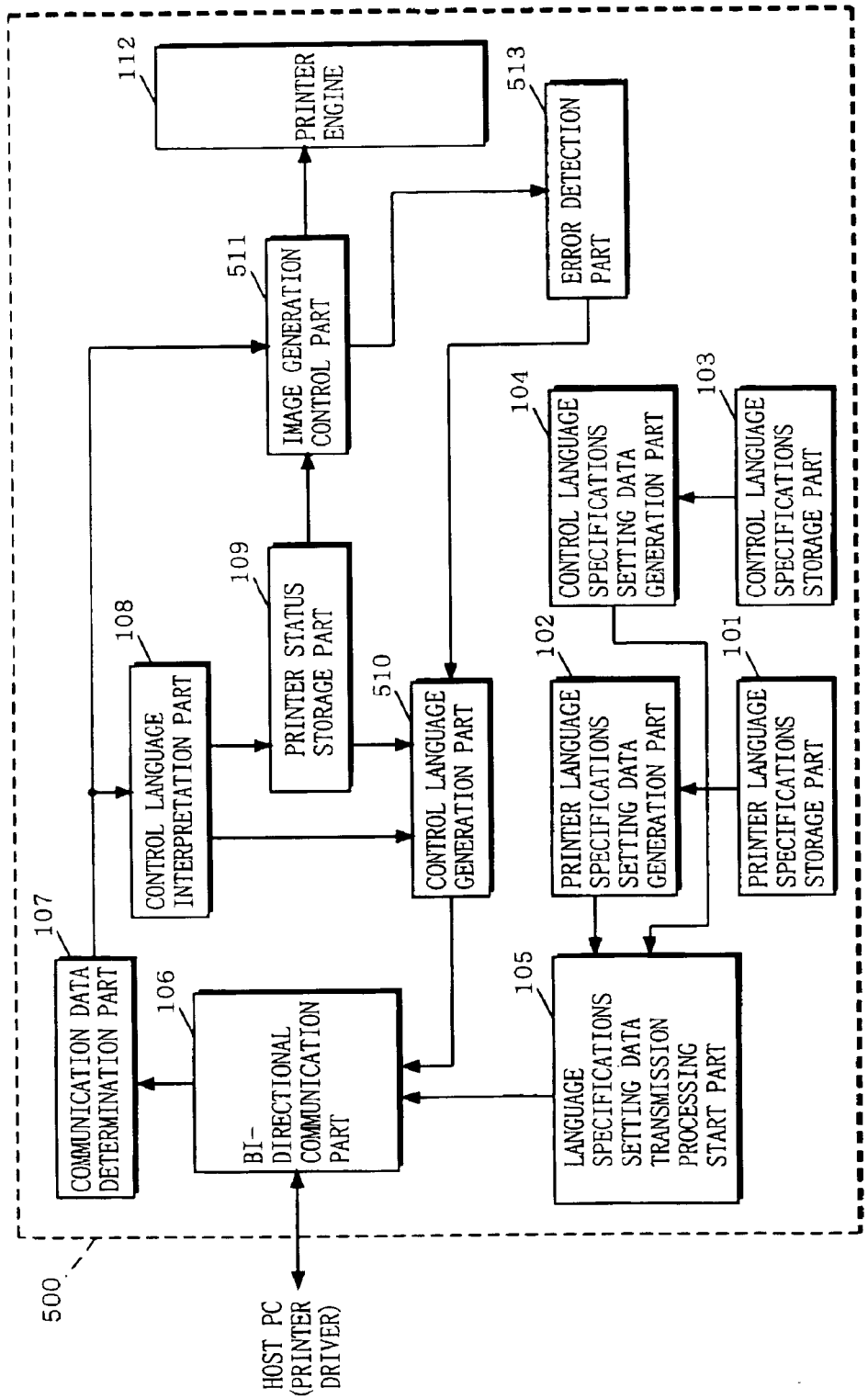
FIG. 9 is a block diagram showing the structure of a printer according to a fifth embodiment of the present invention.

FIG. 9 is a block diagram showing the structure of a printer according to a fifth embodiment of the present invention. In FIG. 9, a printer 500 of the fifth embodiment is provided with the printer language specifications storage part 101, the printer language specifications setting data generation part 102, the control language specifications storage part 103, the control language specifications setting data generation part 104, the language specifications setting data transmission processing start part 105, the bi-directional communication part 106, the communication data determination part 107, the control language interpretation part 108, the printer status storage part 109, a control language generation part 510, an image generation control part 511, the printer engine 112, and an error detection part 513.

As shown in FIG. 9, the printer 500 of the fifth embodiment is provided with the control language generation part 510 and the image generation control part 511 as alternatives to the control language generation part 110 and the image generation control part 111 found in the printer 100 of the first embodiment, and additionally provided with the error detection part 513. Herein, other constituents of the printer 500 are identical to those of the printer 100, therefore being under the same reference numerals and not further described.

Hereinafter, by referring to FIG. 9, it is described how the respective constituents of the printer 500 of the fifth embodiment are operated, more focused on the constituents that differ from those of the printer 100 of the first embodiment.

The image generation control part 511 receives communication data provided from the communication data determination part 107, i.e., a printer language data, so as to interpret the descriptions thereof. In a case where a specific printer language command causes any error in the printing process, the image generation control part 511 notifies the error detection part 513 of error information. Such error may be a case where the printer language data includes a command designating any plot object which is impossible for the printer 500 to process, where any not-interpretable printer language command is included, or where abnormal format, such as command parameter being in short/excess supply, is detected.

The image generation control part 511 also continuously monitors whether a control element designated by the control language command from the host PC is controllable in the printer status storage part 109. When any error is observed, for example, when a control element designated by a specific control language command is uncontrollable, the image generation control part 511 notifies the error detection part 513 of error information.

On receiving the error information from the image generation control part 511, the error detection part 513 detects and specifies a printer language command and/or a control language command which caused the error (hereinafter, error causing command), and then notifies the control language generation part 510 of the error causing command.

On receiving the error causing command from the error detection part 513, the control language generation part 510 generates control language data designating the error causing command for output to the bi-directional communication part 106.

As is known from the above, according to the printer of the fifth embodiment, from the printer to the host PC, the printer language specifications indicating the correspondence between the plot objects and the printer languages, and the control language specifications between the control elements and the control languages can be transmitted. Further, the host PC can be notified of the error causing command which causes errors on the printer.

In this manner, in addition to the effects described in the foregoing, the host PC can be set not to use the error causing command after the notification, thereby successfully avoiding any error.

In the fifth embodiment, although the structures of the control language generation part 510, the image generation control part 511, and the error detection part 513 are exemplarily adopted to the printer 100 of the first embodiment, the structures thereof may be adopted to the printers 200 to 400 of the second to fourth embodiments.

(Sixth Embodiment)

Figure 10:
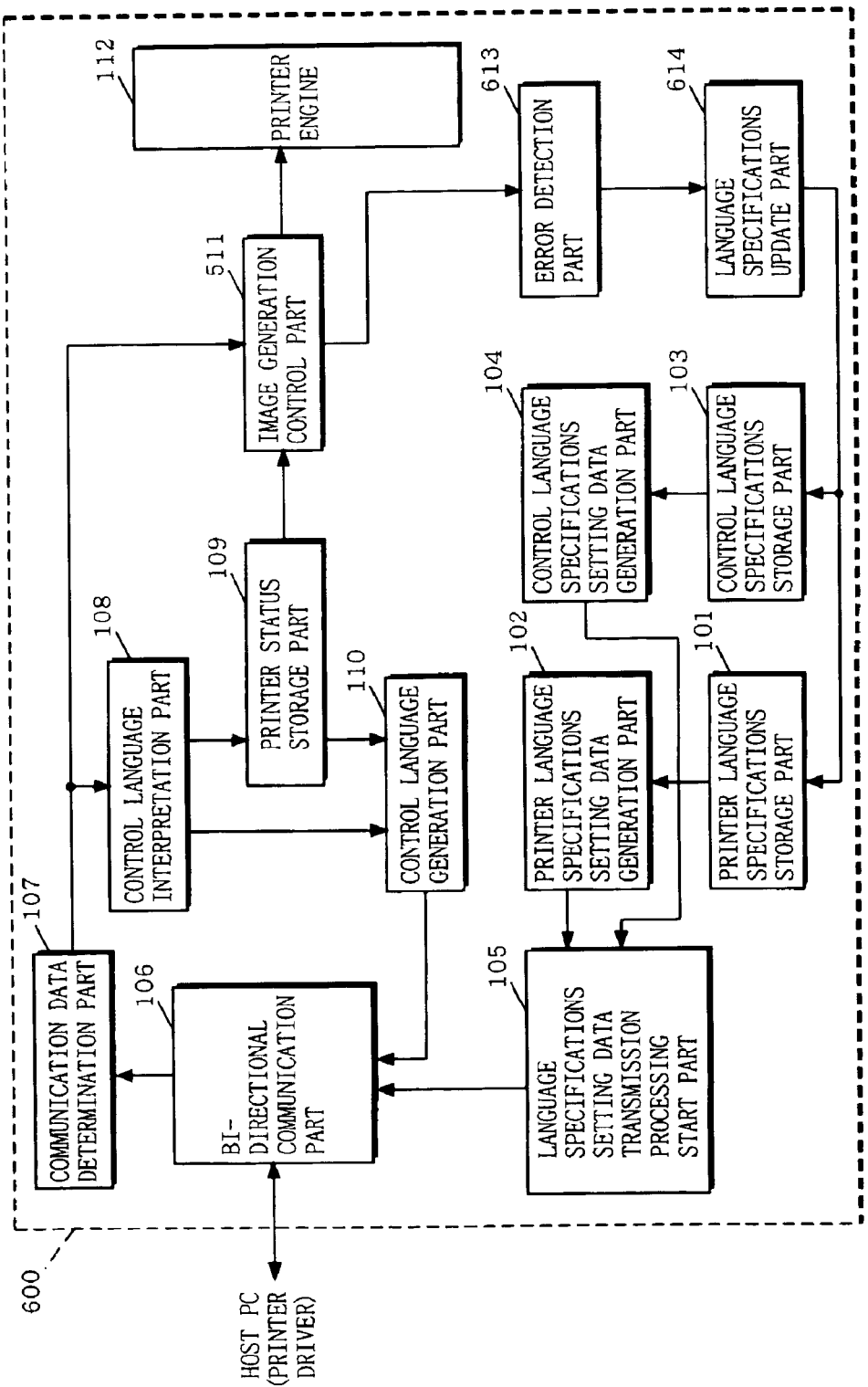
FIG. 10 is a block diagram showing the structure of a printer according to a sixth embodiment of the present invention.

FIG. 10 is a block diagram showing the structure of a printer according to a sixth embodiment of the present invention. In FIG. 10, a printer 600 of the sixth embodiment is provided with the printer language specifications storage part 101, the printer language specifications setting data generation part 102, the control language specifications storage part 103, the control language specifications setting data generation part 104, the language specifications setting data transmission processing start part 105, the bi-directional communication part 106, the communication data determination part 107, the control language interpretation part 108, the printer status storage part 109, the control language generation part 110, the image generation control part 511, the printer engine 112, an error detection part 613, and a language specifications update part 614.

As shown in FIG. 10, the printer 600 of the sixth embodiment is provided with the image generation control part 511 of the fifth embodiment as an alternative to the image generation control part 111 found in the printer 100 of the first embodiment, and additionally provided with the error detection part 613 and the language specifications update part 614. Herein, other constituents of the printer 600 are identical to those of the printers 100 and 500, therefore being under the same reference numerals and not further described.

Hereinafter, by referring to FIG. 10, it is described how the respective constituents of the printer 600 of the sixth embodiment are operated, more focused on the constituents that differ from those of the printers 100 and 500 of the first and fifth embodiments.

The error detection part 613 receives error information from the image generation control part 511, detects and specifies an error causing command causing the error, and then notifies the language specifications update part 614 of the error causing command.

The language specifications update part 614 updates the printer language specifications stored in the printer language specifications storage part 101 so as to prevent the host PC from using the error causing command, i.e., printer language command, notified by the error detection part 613. At the same time, the language specifications update part 614 instructs (provides a trigger) the printer language specifications setting data generation part 102, via the printer language specifications storage part 101, to generate printer language specifications setting data corresponding to the updated printer language specifications.

Similarly, the language specifications update part 614 updates the control language specifications stored in the control language specifications storage part 103 so as to prevent the host PC from using the error causing command, i.e., control language command, notified by the error detection part 613. At the same time, the language specifications update part 614 instructs (provides a trigger) the control language specifications setting data generation part 104, via the control language specifications storage part 103, to generate control language specifications setting data corresponding to the updated control language specifications.

The printer language specifications setting data generation part 102 and the control language specifications setting data generation part 104 each read language specifications of their own from the printer language specifications storage part 101 and the control language specifications storage part 103 according to the instruction provided from the language specifications update part 614, and then generates to-be-transmitted-to-the-host-PC printer language specifications setting data and control language specifications setting data in accord with the predetermined data format for output to the language specifications setting data transmission processing start part 105.

As is known from the above, according to the printer of the sixth embodiment, from the printer to the host PC, the printer language specifications indicating the correspondence between the plot objects and the printer languages, and the control language specifications between the control elements and the control languages can be transmitted. Further, each language specification is updated, as appropriate, so as to prevent the host PC from using the error causing command which causes errors on the printer.

In this manner, in addition to the effects described in the foregoing, the host PC is set not to use the error causing command, thereby avoiding any error without effort.

In the sixth embodiment, although the structures of the image generation control part 511, the error detection part 613, and the language specifications update part 614 are exemplarily adopted to the printer 100 of the first embodiment, the structures thereof may be adopted to the printers 200 to 500 of the second to fifth embodiments.

(Seventh Embodiment)

Figure 11:
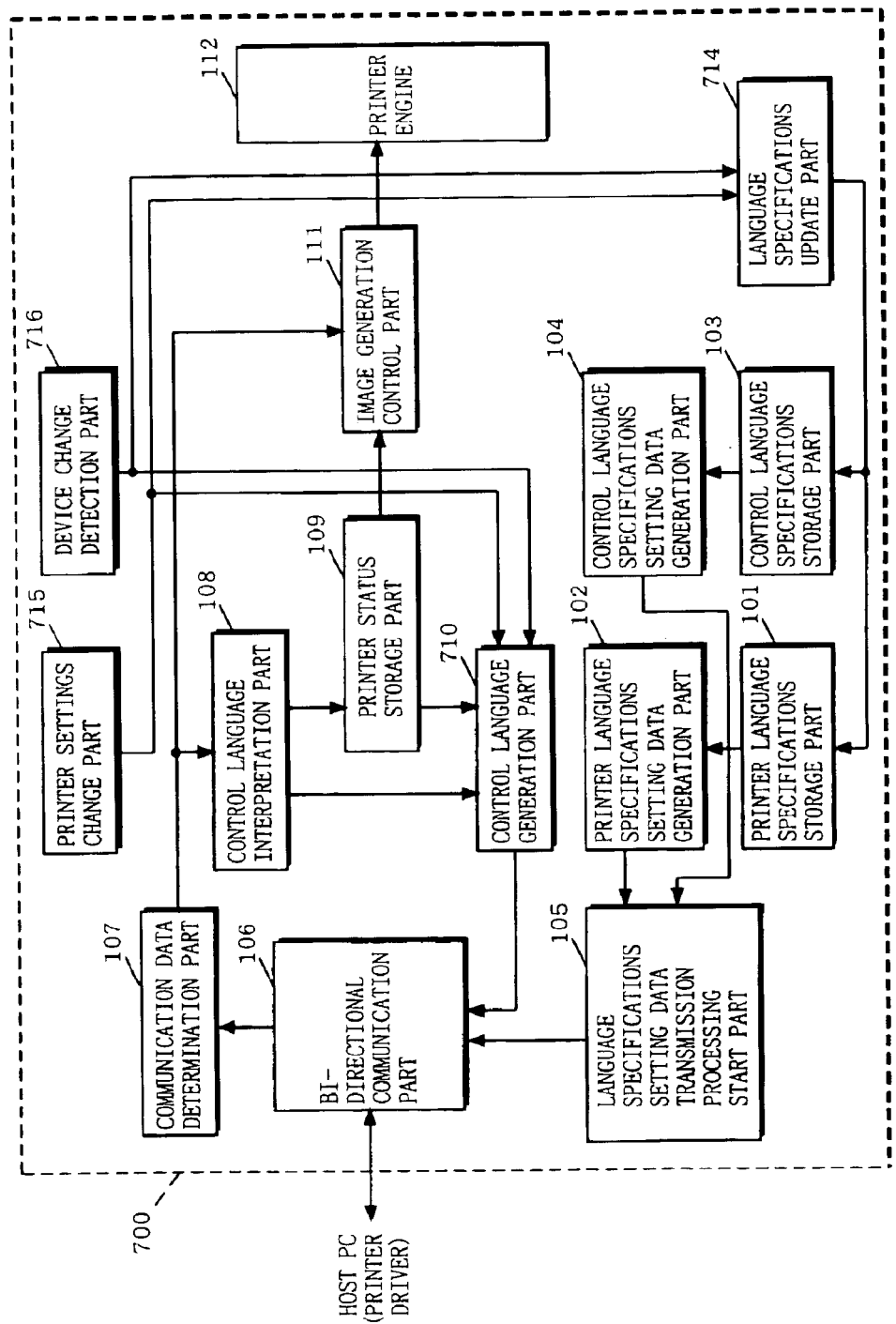
FIG. 11 is a block diagram showing the structure of a printer according to a seventh embodiment of the present invention.

FIG. 11 is a block diagram showing the structure of a printer according to a seventh embodiment of the present invention. In FIG. 11, a printer 700 of the seventh embodiment is provided with the printer language specifications storage part 101, the printer language specifications setting data generation part 102, the control language specifications storage part 103, the control language specifications setting data generation part 104, the language specifications setting data transmission processing start part 105, the bi-directional communication part 106, the communication data determination part 107, the control language interpretation part 108, the printer status storage part 109, a control language generation part 710, the image generation control part 111, the printer engine 112, a language specifications update part 714, a printer settings change part 715, and a device change detection part 716.

As shown in FIG. 11, the printer 700 of the seventh embodiment is provided with the control language generation part 710 as an alternative to the control language generation part 110 found in the printer 100 of the first embodiment, and additionally provided with the language specifications update part 714, the printer settings change part 715, and the device change detection part 716. Herein, other constituents of the printer 700 are identical to those of the printer 100, therefore being under the same reference numerals and not further described.

Hereinafter, by referring to FIG. 11, it is described how the respective constituents of the printer 700 of the seventh embodiment are operated, more focused on the constituents that differ from those of the printer 100 of the first embodiment.

When the user changes any setting relevant to the operation of the printer through a separately-provided printer settings change input part (not shown), the details of the change are provided to the printer settings charge part 715. Such change may be a change of print quality mode (speed priority/quality priority), a change of default paper feeding slot, a change of availability of perfecting press unit, a change of printer command type in use, or a change of printer font in use. If any change is observed, the printer settings change part 715 notifies at least either the control language generation part 710 or the language specifications update part 714 of the details thereof.

The device change detection part 716 monitors at least one of the constituents of the printer 700, e.g., memory, input tray, output tray, font cartridge, CPU (Central Processing Unit), and firmware, so as to detect any change as to constituents (addition/deletion of options as well as settings change). If any change is detected, the device change detection part 716 notifies at least either the control language generation part 710 or the language specifications update part 714 of the details thereof.

When the details of the change are notified to the control language generation part 710, in a similar manner to the control language generation part 510 of the fifth embodiment, the control language generation part 710 generates control language data in accord with the details of the change for output to the bi-directional communication part 106.

When the details of the change are notified to the language specifications update part 714, in a similar manner to the language specifications update part 614 of the sixth embodiment, the language specifications update part 714 updates the printer language specifications stored in the printer language specifications storage part 101 and the control language specifications stored in the control language specifications storage part 103 so as to prevent the host PC from using commands before the change. The language specifications update part 714, simultaneously, instructs the printer language specifications setting data generation part 102 and the control language specifications setting generation part 104 to generate language specifications setting data corresponding to the updated language specifications.

As is known from the above, according to the printer of the seventh embodiment, from the printer to the host PC, the printer language specifications indicating the correspondence between the plot objects and the printer languages, and the control language specifications between the control elements and the control languages can be transmitted. Further, the host PC can be notified of the details of the user's change made on the printer as to printer settings and constituents.

In this manner, in addition to the effects described in the foregoing, in the host PC, the descriptions of to-generate printer print data and printer control data can be changed in relation to such change on the printer side.

In the seventh embodiment, although the structures of the control language generation part 710, the language specifications update part 714, the printer settings change part 715, and the device change detection part 716 are exemplarily adopted to the printer 100 of the first embodiment, the structures thereof may be adopted to the printers 200 to 600 of the second to sixth embodiments.

Further, although described in the first to seventh embodiments are the printers 100 to 700 in which the control language specifications storage part 103 and the control language specifications setting data generation parts 104, 204, 304 and 404 are provided, there constituents may be taken removed if the printer has no control for the control elements (e.g., when every status is fixedly set).

(Eight Embodiment)

Figure 12:
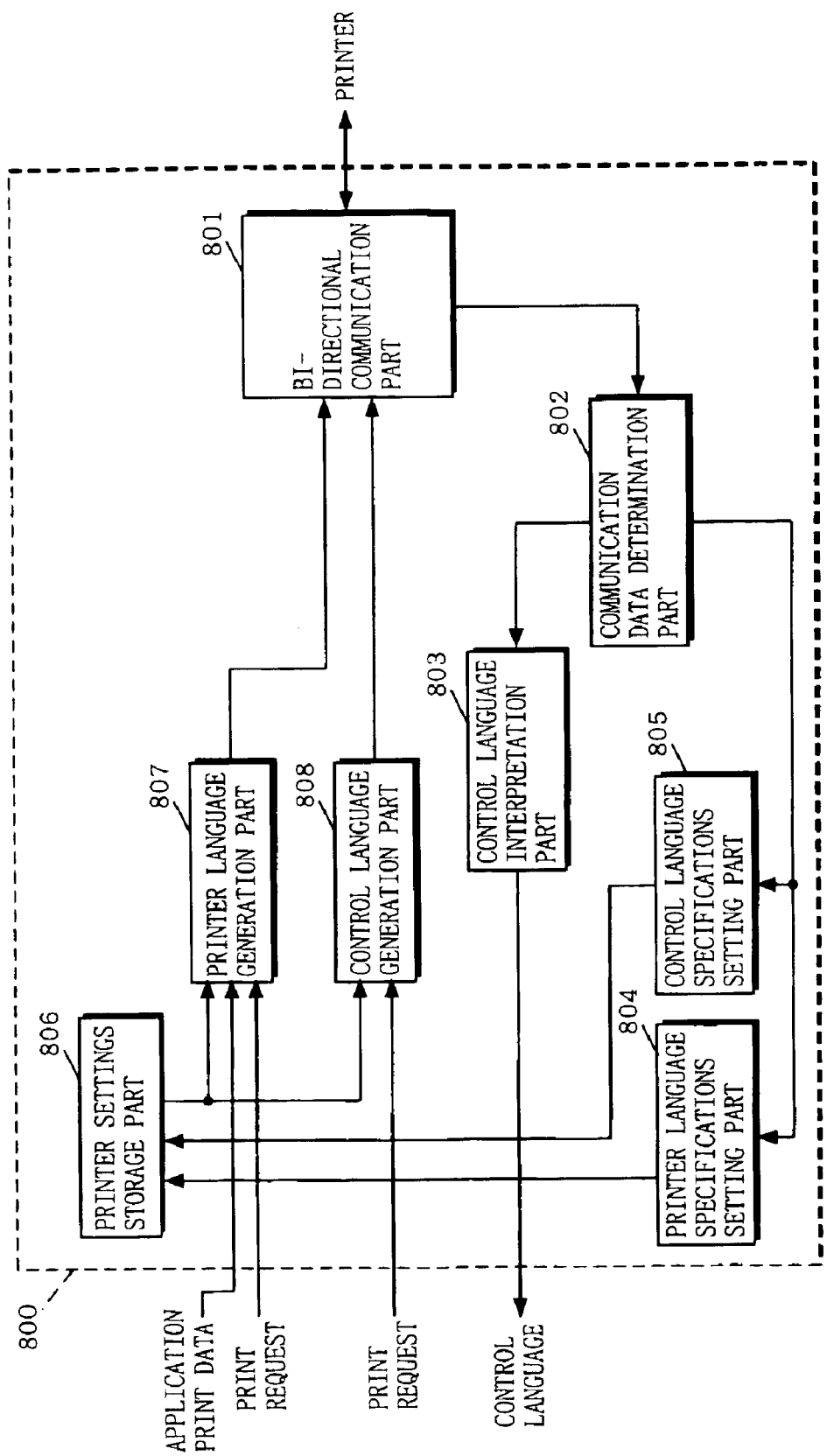
FIG. 12 is a block diagram showing the structure of a printer driver according to an eighth embodiment of the present invention.

FIG. 12 is a block diagram showing the structure of a printer driver according to an eighth embodiment of the present invention. In FIG. 12, a printer driver 800 of the eighth embodiment is provided with a bi-directional communication part 801, a communication data determination part 802, a control language interpretation part 803, a printer language specifications setting part 804, a control language specifications setting part 805, a printer settings storage part 806, a printer language generation part 807, and a control language generation part 808.

The printer driver 800 of the eighth embodiment is a printer driver for use along with the printer 100 of the first embodiment.

Hereinafter, by referring to FIG. 12, it is described how the respective constituents of the printer driver 800 are operated.

The bi-directional communication part 801 performs transmission/reception of data between the printer driver 800 (provided in a host PC) and a printer by means of bi-directional communications. The bi-directional communication part 801 receives later-described print data from the printer language generation part 807 and the control language generation part 808 for transmission to the printer, and also receives communication data from the printer for output to the communication data determination part 802.

The communication data determination part 802 analyzes the communication data received from the bi-directional communication part 801 so as to determine the type thereof: control language data; printer language specifications setting data (see FIG. 3); or control language specifications setting data (see FIG. 5). The communication data determination part 802, for example, determines the type of data by referring to a data identifier provided at the head thereof. Thereafter, the communication data determination part 802 forwards the communication data according to the determination, i.e., to the control language interpretation part 803 if the data is determined as being control language data, to the printer language specifications setting part 804 if the data is determined as being printer language specifications setting data, and to the control language specifications setting part 805 if the data is determined as being control language specifications setting data.

The printer language specifications setting part 804 analyzes the printer language specifications setting data provided from the communication data determination part 802, assigns each plot object in application print data, which is data generated by an application on the host PC at printing, to printer languages (commands) usable on the printer, and then registers the correspondence in the printer settings storage part 806.

The control language specifications setting part 805 analyzes the control language specifications setting data provided from the communication data determination part 802, assigns each control element set according to the user's instruction in the application on the host PC to control languages (commands) usable on the printer, and then registers the correspondence in the printer settings storage part 806.

After the registration processing carried out by the printer language specifications setting part 804 and the control language specifications setting part 805, the printer settings storage part 806 stores the correspondence between the plot objects and the printer languages and between the control elements and the control languages in a table, as shown in FIGS. 2 and 4.

In this manner, information on printer languages and control languages usable on the connected printer can be automatically stored in the printer settings storage part 806 without user's intervention.

Thereafter, in a similar manner to the conventional printer driver 2100 in the foregoing, the printer driver 800 is operated in the following manner according to the user's printing instruction received through an application operable on the host PC.

On receiving the user's printing instruction, the host PC generates application print data corresponding thereto, through the application, for output to the printer language generation part 807 (2107). On receiving the application print data, the printer language generation part 807 replaces the plot objects therein with each corresponding printer language by referring to the information stored in the printer settings storage part 806 (2106) so as to generate printer language print data usable on the connected printer. On the other hand, when the user makes any change as to control elements on a setting screen (e.g., selection of input tray or paper), the host PC forwards the details of such change to the control language generation part 808 (2108) via the application. After receiving the details of the change, the control language generation part 808 replaces the control element to which the change was made with the control language corresponding thereto by referring to the information stored in the printer settings storage part 806 so as to generate control language print data usable on the connected printer. Thereafter, the generated language print data and the control language print data is transmitted through the bi-directional communication part 801 (2101) to the printer as communication data. Note that, the control language interpretation part 803 (2103) interprets a response from the printer to the inquiry for output to the not-shown comprehensive control part of the host PC.

As is known from the above, according to the printer driver of the eighth embodiment, the descriptions in the printer settings storage part are automatically set (updated) according to the printer language specifications setting data and the control language specifications setting data provided from the printer.

In this manner, without the user's concern for the type of printer languages or the version thereof supportable by the printer, the host PC can always generate print data written in a usable language on the printer connected thereto. Therefore, even if a plurality of printers are in use, printing in an optimal manner is always promised, and the storage resources can be utilized.

(Ninth Embodiment)

Figure 13:
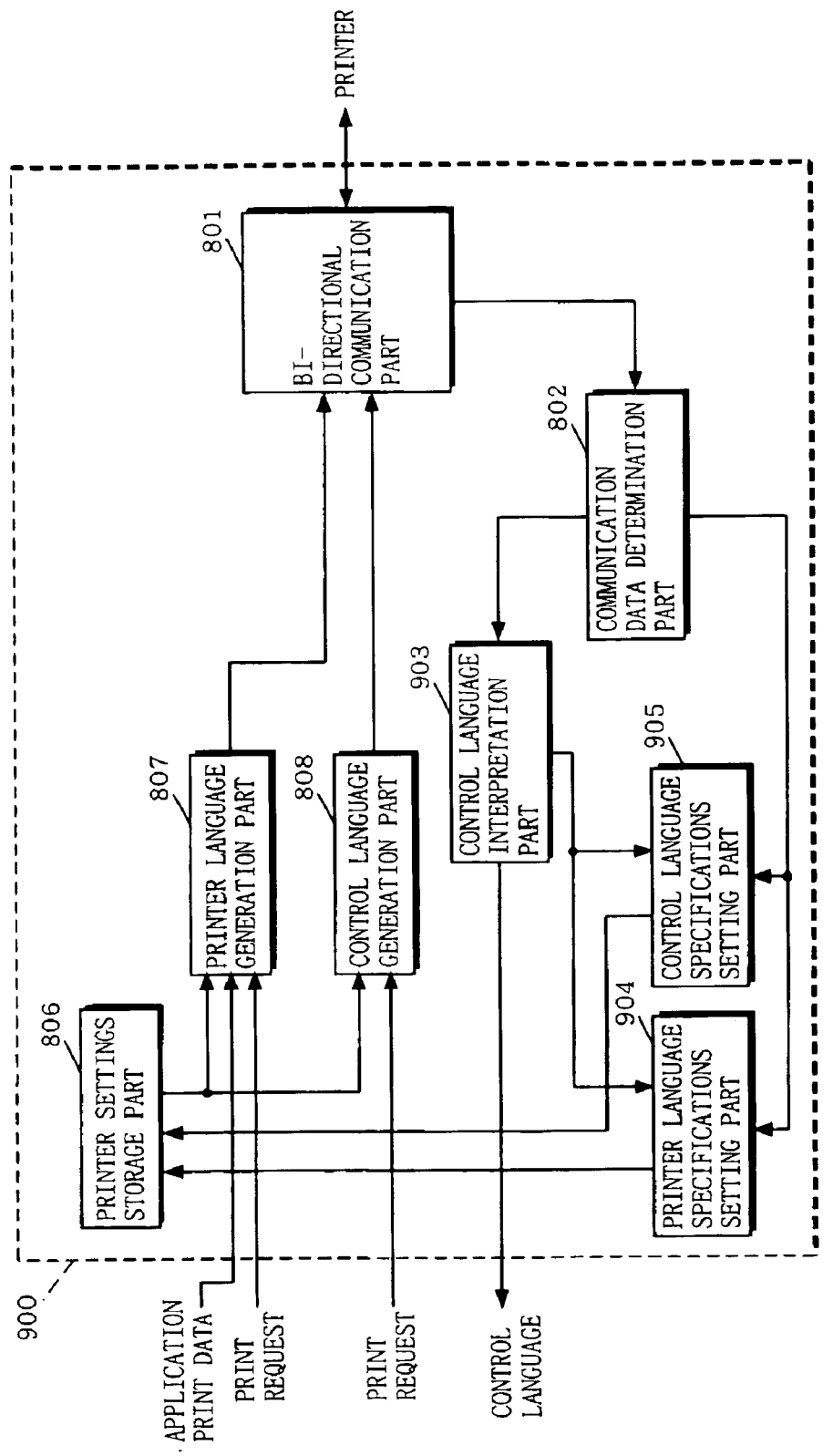
FIG. 13 is a block diagram showing the structure of a printer driver according to a ninth embodiment of the present invention.

FIG. 13 is a block diagram showing the structure of a printer driver according to a ninth embodiment of the present invention. In FIG. 13, a printer driver 900 of the ninth embodiment is provided with the bi-directional communication part 801, the communication data determination part 802, a control language interpretation part 903; a printer language specifications setting part 904, a control language specifications setting part 905, the printer settings storage part 806, the printer language generation part 807, and the control language generation part 808.

The printer driver 900 of the ninth embodiment is a printer driver for use along with the printers 100 and 200 of the first and second embodiments.

As shown in FIG. 13, the printer driver 900 of the ninth embodiment is provided with the control language interpretation part 903, the printer language specifications setting part 904, and the control language specifications setting part 905 as alternatives to the control language interpretation part 803, the printer language specifications setting part 804, and the control language specifications setting part 805 found in the printer driver 800 of the eighth embodiment. Herein, other constituents of the printer driver 900 are identical to those of the printer driver 800, therefore being under the same reference numerals and not further described.

Hereinafter, by referring to FIG. 13, it is described how the respective constituents of the printer driver 900 of the ninth embodiment are operated, more focused on the constituents that differ from those of the printer driver 800 of the eighth embodiment.

The control language interpretation part 903 receives control language data from the communication data determination part 802. The control language interpretation part 903 interprets the received control language data so as to determine whether the data includes printer language specifications setting data and/or control language specifications setting data transmitted in a format of the control language. If the control language data is determined as including the printer language specifications setting data, the control language interpretation part 903 extracts the data for output to the printer language specifications setting part 904. If the control language data is determined as including the control language specifications setting data, the control language interpretation part 903 extracts the data for output to the control language specifications setting part 905.

Not that, as to control language data, such as a response from the printer to an inquiry, the control language interpretation part 903 forwards the data to the comprehensive control part (not shown) in the host PC as is typically done.

The printer language specifications setting part 904 analyzes the printer language specifications setting data provided from the communication data determination part 802 or the control language interpretation part 803, assigns each plot object in application print data, which is data generated by an application on the host PC at printing, to printer languages (commands) usable on the printer, and the registers the correspondence in the printer settings storage part 806.

The control language specifications setting part 905 analyzes the control language specifications setting data provided from the communication data determination part 802 or the control language interpretation part 803, assigns each control element set according to the user's instruction in the application on the host PC to control languages (commands) usable on the printer, and then registers the correspondence in the printer settings storage part 806.

As is known from the above, according to the printer driver of the ninth embodiment, the descriptions in the printer settings storage part are automatically set (updated) according to the printer language specifications setting data or the control language specifications setting data provided from the printer as control language data.

In this manner, in addition to the effects described in the foregoing, even if being incapable of directly receiving the printer language specifications setting data and the control language specifications setting data, the printer driver can always generate print data in a usable language on the printer connected to the host PC.

(Tenth Embodiment)

Figure 14:
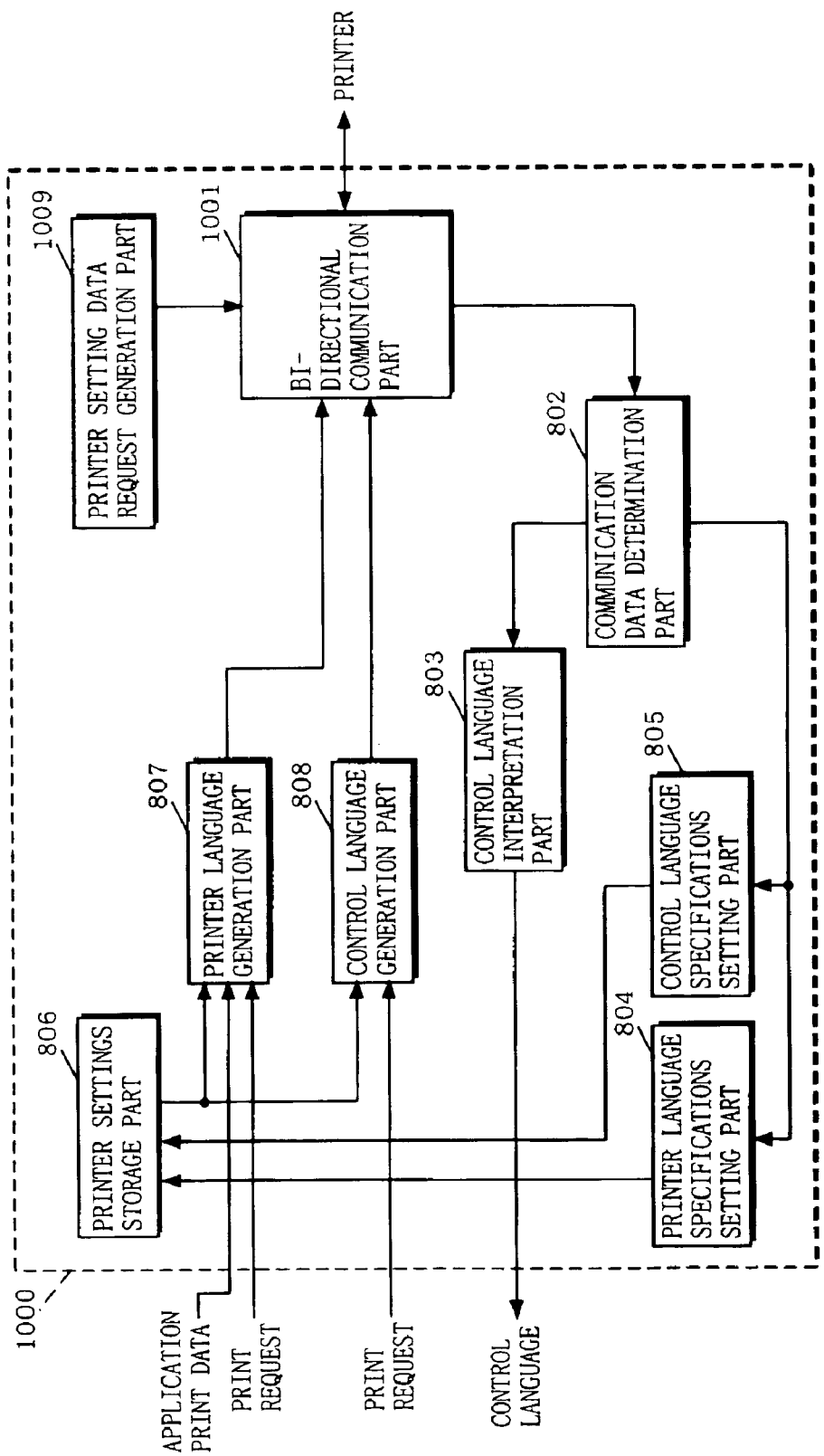
FIG. 14 is a block diagram showing the structure of a printer driver according to a tenth embodiment of the present invention.

FIG. 14 is a block diagram showing the structure of a printer driver according to a tenth embodiment of the present invention. In FIG. 14, a printer driver 1000 of the tenth embodiment is provided with a bi-directional communication part 1001, the communication data determination part 802, the control language interpretation part 803, the printer language specifications setting part 804, the control language specifications setting part 805, the printer settings storage part 806, the printer language generation part 807, the control language generation part 808, and a printer setting data request generation part 1009.

The printer driver 1000 of the tenth embodiment is a printer driver for use along with the printer 300 of the third embodiment.

As shown in FIG. 14, the printer driver 1000 of the tenth embodiment is provided with the bi-directional communication part 1001 as an alternative to the bi-directional communication part 801 found in the printer driver 800 of the eighth embodiment, and additionally provided with the printer setting data request generation part 1009. Herein, other constituents of the printer driver 1000 are identical to those of the printer driver 800, therefore being under the same reference numeral and not further described.

Hereinafter, by referring to FIG. 14, it is described how the respective constituents of the printer driver 1000 of the tenth embodiment are operated, more focused on the constituents that differ from those of the printer driver 800 of the eighth embodiment.

The printer setting data request generation part 1009 generates, with an arbitrary timing for the printer, requesting data asking for at least either the printer language specification setting data or the control language specifications setting data, and then outputs the same to the bi-directional communication part 1001. The arbitrary timing herein may be when the host PC is booted, when the user makes any designation on a setting screen of an application or a printer driver, or when reboot of the printer is detected.

The requesting data generated by the printer setting data request generation part 1009 is formed by a data identifier indicating data attribute and a requesting data designation flag designating the request in detail. To the requesting data designation flag, a flag designating at least either the printer language specifications setting data or the control language specifications setting data is set.

The bi-directional communication part 1001 receives the requesting data from the printer setting data request generation part 1009 for transmission to the printer as communication data.

As is known from the above, according to the printer driver of the tenth embodiment, the printer language specifications setting data and/or the control language specifications setting data for automatically setting (updating) the descriptions in the printer settings storage part is requested to the printer with an arbitrary timing.

In this manner, in addition to the effects described in the foregoing, there is no more need to continuously monitor the printer language specifications setting data and the control language specifications setting data, thereby cutting down overhead thereof.

In the tenth embodiment, although the structures of the bi-directional communication part 1001 and the printer setting data request generation part 1009 are exemplarily adopted to the printer driver 800 of the eighth embodiment, the structures thereof may be adopted to the printer driver 900 of the ninth embodiment.

(Eleventh Embodiment)

Figure 15:
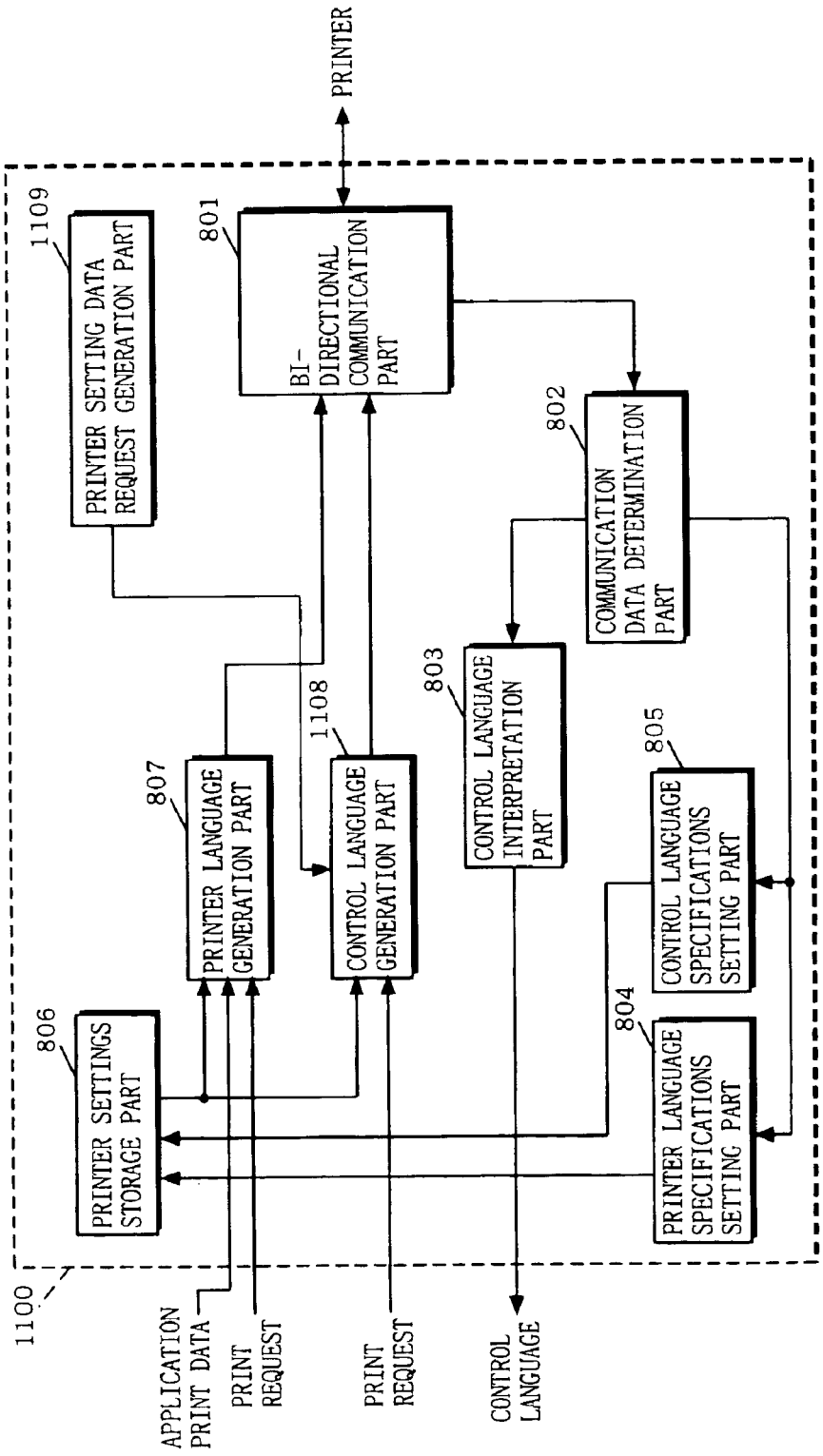
FIG. 15 is a block diagram showing the structure of a printer driver according to an eleventh embodiment of the present invention.

FIG. 15 is a block diagram showing the structures of a printer driver according to an eleventh embodiment of the present invention. In FIG. 15, a printer driver 1100 of the eleventh embodiment is provided with the bi-directional communication part 801, the communication data determination part 802, the control language interpretation part 803, the printer language specifications setting part 804, the control language specifications setting part 805, the printer settings storage part 806, the printer language generation part 807, a control language generation part 1108, and a printer setting data request generation part 1109.

The printer driver 1100 of the eleventh embodiment is a printer driver for use along with the printer 400 of the fourth embodiment.

As shown in FIG. 15, the printer driver 1100 of the eleventh embodiment is provided with the control language generation part 1108 as an alternative to the control language generation part 808 found in the printer driver 800 of the eighth embodiment, and additionally provided with the printer setting data request generation part 1109. Herein, other constituents of the printer driver 1100 are identical to those of the printer driver 800, therefore being under the same reference numerals and not further described.

Hereinafter, by referring to FIG. 15, it is described how the respective constituents of the printer driver 1100 of the eleventh embodiment are operated, more focused on the constituents that differ from those of the printer driver 800 of the eighth embodiment.

The printer setting data request generation part 1109 generates, with an arbitrary timing for the printer, requesting data asking for at least either the printer language specifications setting data or the control language specifications setting data, and then outputs the same to the control language generation part 1108. The arbitrary timing herein may be when the host PC is booted, when the user makes any designation on a setting screen of an application or a printer driver, or when reboot of the printer is detected.

The requesting data generated by the printer setting data request generation part 1109 is formed by a data identifier indicating data attribute and a requesting data designation flag designating the request in detail. To the requesting data designation flag, a flag designating at least either the printer language specifications setting data or the control language specifications setting data is set.

The control language generation part 1108 receives the requesting data from the printer setting data request generation part 1109, and then generates control language print data formed only by the descriptions of the requesting data or control language print data in which the descriptions of the requesting data are added to existing print data. Such control language print data is transmitted through the bi-directional communication part 801 to the printer as communication data.

As is known from the above, according to the printer driver of the eleventh embodiment, the printer language specifications setting data and/or the control language specifications setting data for automatically setting (updating) the descriptions in the printer settings storage part is requested to the printer, with an arbitrary timing and in the format of the control language.

In this manner, in addition to the effects described in the foregoing, there is no more need to newly provide a constituent for determining requesting data generated in the printer setting data request generation part in the printer.

In the eleventh embodiment, although the structures of the control language generation part 1108 and the printer setting data request generation part 1009 are exemplarily adopted to the printer driver 800 of the eighth embodiment, the structures thereof may be adopted to the printer drivers 900 and 1000 of the ninth and tenth embodiments.

(Twelfth Embodiment)

Figure 16:
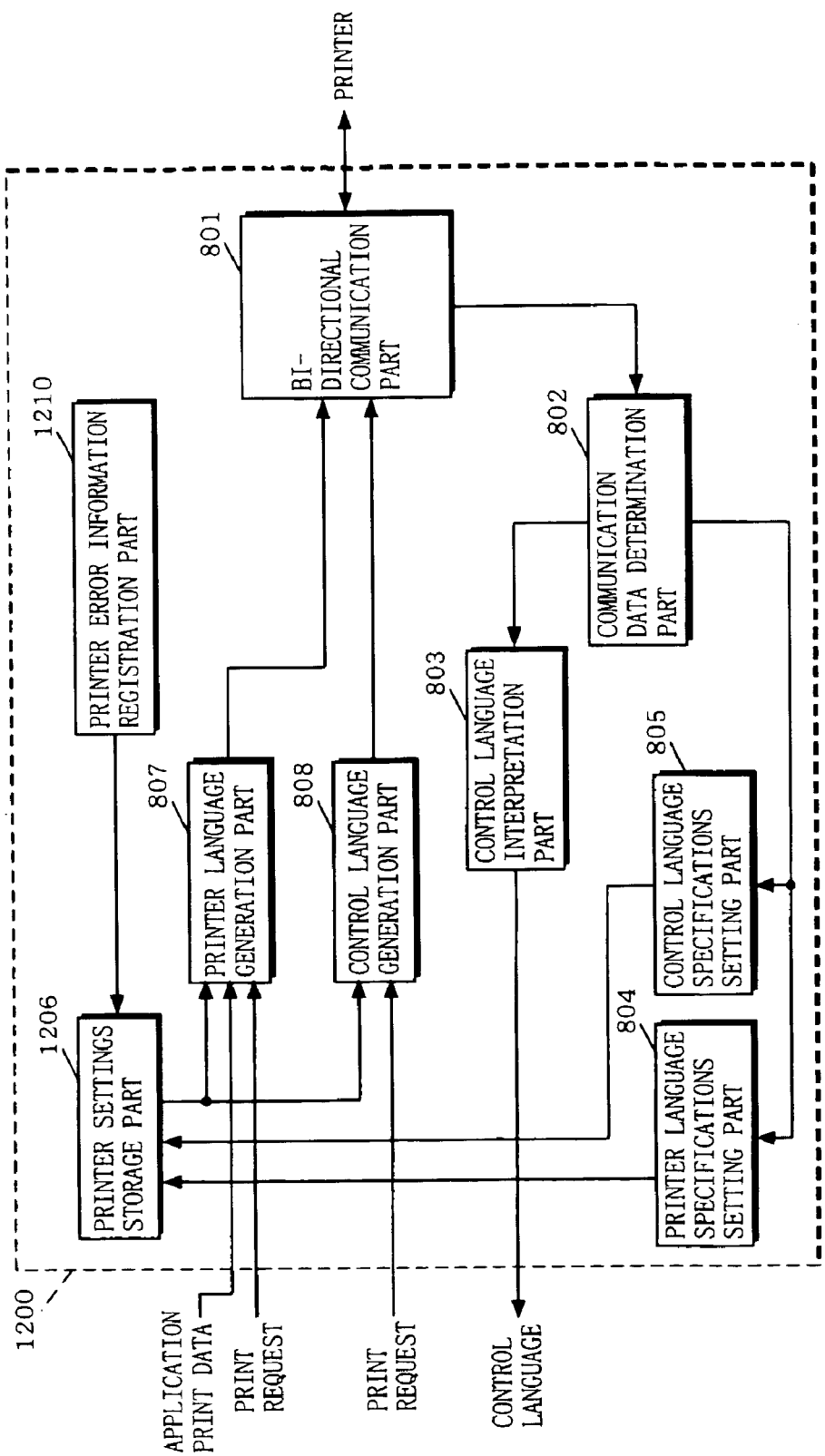
FIG. 16 is a block diagram showing the structure of a printer driver according to a twelfth embodiment of the present invention.

FIG. 16 is a block diagram showing the structure of a printer driver according to a twelfth embodiment of the present invention. In FIG. 16, a printer driver 1200 of the twelfth embodiment is provided with the bi-directional communication part 801, the communication data determination part 802, the control language interpretation part 803, the printer language specifications setting part 804, the control language specifications setting part 805, a printer settings storage part 1206, the printer language generation part 807, the control language generation part 808, and a printer error information registration part 1210.

FIG. 17 is an exemplary specifically showing printer language setting data stored in the printer settings storage part 1206 in FIG. 16. FIG 18 is an exemplary table specifically showing control language setting data stored in the printer settings storage part 1206 in FIG. 16. FIG. 19 is a diagram showing an exemplary method of drawing a plot object when any error is observed.

As shown in FIG. 16, the printer driver 1200 of the twelfth embodiment is provided with the printer settings storage part 1206 as an alternative to the printer settings storage part 806 found in the printer driver 800 of the eighth embodiment, and additionally provided with the printer error information registration part 1210. Herein, other constituents of the printer driver 1200 are identical to those of the printer driver 800, therefore being under the same reference numerals and not further described.

Hereinafter, by referring to FIGS. 16 to 19, it is described how the respective constituents of the printer driver 1200 of the twelfth embodiment are operated, more focused on the constituents that differ from those of the printer driver 800 of the eighth embodiment.

According to separately-provided information relevant to any error observed in the drawing process in the printer (hereinafter, referred to as printer error information), the printer error information registration part 1210 registers, in the printer settings storage part 1206, error information in which a certain plot object is assigned at least to one of the printer language commands. Typically, the printer error information registration part 1210 is booted in association with a setting screen of the printer driver 1200 on the host PC, and in accord with an error observed on the printer, registers error information designated by the user on the setting screen in the printer settings storage part 1206. Herein, the printer error information relevant to drawing is information indicating that a specific printer language command on the printer has causes an error in the printing process. Such error may be a case where the printer language data includes a command designating any plot object which is impossible for the printer to process, where any not-interpretable printer language command is included, or where an abnormal format, such as command parameter being in short/excess supply is detected.

The printer error information registration part 1210 also registers, according to separately-provided printer error information relevant to control in the printer, error information in which a certain control element is assigned at least to one of the control language commands in the printer settings storage part 1206. Herein, the printer error information relevant to control is information indicating that a specific control language command on the printer has caused an error in the printing process. Such error may be a case where a control element designated by the control language command is uncontrollable, for example.

As is described in the foregoing, after the registration process carried out by the printer language specifications setting part 804 and the control language specifications setting part 805, the printer settings storage part 1206 stores the correspondence between the plot objects and the printer languages and between the control elements and the control languages. Herein, the plot objects stored in the printer settings storage part 1206 (basic plot objects) are, as shown in FIG. 17, each linked to plot objects (link plot objects) predetermined therefor. Such link plot object is used when the basic plot object cannot be drawn due to some errors (e.g., when the printer language assigned thereto is not usable), and is used to divide the basic plot object into parts and replace thereby. Further, the control elements stored in the printer settings storage part 1206 (basic control elements) are, as shown in FIG. 18, each linked to control elements (link control elements) predetermined therefor. Such link control element is used when the basic control element is uncontrollable (e.g., when the control language assigned thereto is not usable), and is used to replace the basic control element therewith.

Thereafter, according to the registration carried out by the printer error information registration part 1210, the printer settings storage part 1206 stores error information indicating whether or not any error is observed on the printer by using the printer language or the control language each assigned to the basic plot object and the basic control element (FIGS. 17 and 18). In FIGS. 17 and 18, the basic plot objects and the basic control elements having errors are exemplarily marked with "x".

By referring to FIGS. 17 and 19(c), it is exemplarily described how to draw a circle when any error is observed in a plot object "circle".

On receiving application print data relevant to drawing a circle, the printer language generation part 807 first refers to error information on the basic plot object "circle" stored in the printer settings storage part 1206. As the error is observed in the example, the printer language generation part 807 next refers to the link information on the basic plot object "circle" so as to confirm that the link plot object thereof is "rectangle". Thereafter, the printer language generation part 807 reorganizes a circle by means of rectangles (FIG. 19(b)), and then generates printer language print data whose printer language is replaced with the one assigned to the plot object "rectangle".

In a case where the error information on the link plot object "rectangle" is also marked with "x", the printer language generation part 807 traces back the link information to a greater extent, and then reorganizes the circle by means of lines (FIG. 19(c)) so as to generate printer language print data whose printer language is replaced with the one assigned to the plot object "line".

As is known from the above, according to the printer driver of the twelfth embodiment, the descriptions in the printer settings storage part are automatically set (updated) according to the printer language specifications setting data and the control language specifications setting data provided from the printer. In addition thereto, the plot objects and the control elements (language commands) causing errors on the printer are stored in the printer settings storage part.

In this manner, in addition to the effects described in the foregoing, it becomes possible to generate print data which use no language command causing errors on the printer, thereby successfully avoiding any printing error on the printer.

In the twelfth embodiment, although the structures of the printer settings storage part 1206 and the printer error information registration part 1210 are exemplarily adopted to the printer driver 800 of the eighth embodiment, the structures thereof may be adopted to the printer drivers 900 to 1100 of the ninth to eleventh embodiments.

(Thirteenth Embodiment)

Figure 20:
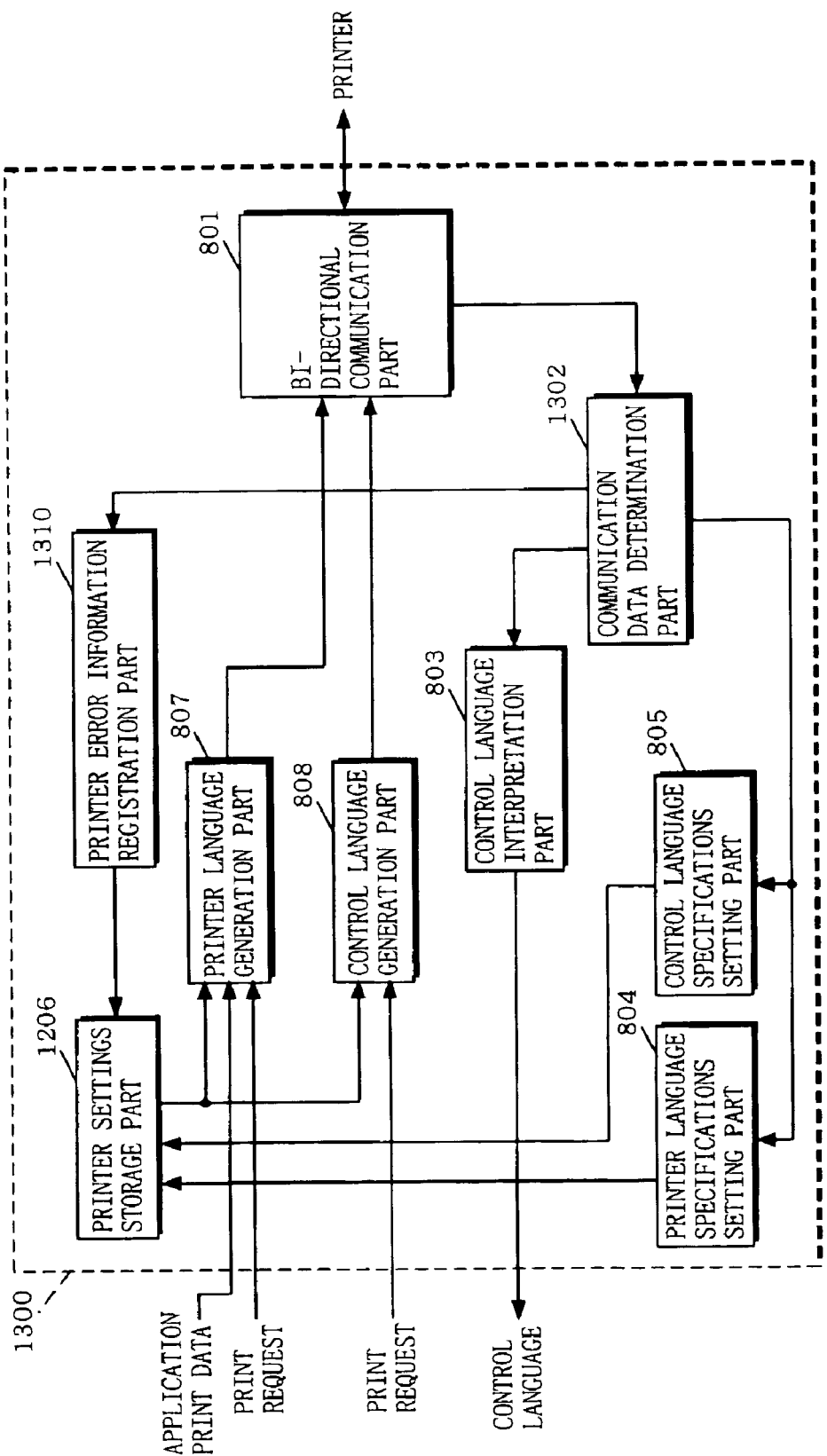
FIG. 20 is a block diagram showing the structure of a printer driver according to a thirteenth embodiment of the present invention.

FIG. 20 is a block diagram showing the structure of a printer driver according to a thirteenth embodiment of the present invention. In FIG. 20, a printer driver 1300 of the thirteenth embodiment is provided with the bi-directional communication part 801, a communication data determination part 1302, the control language interpretation part 803, the printer language specifications setting part 804, the control language specifications setting part 805, the printer settings storage part 1206, the printer language generation part 807, the control language generation part 808, and a printer error information registration part 1310.

The printer driver 1300 of the thirteenth embodiment is a printer driver for use along with the printer 500 of the fifth embodiment.

As shown in FIG. 20, the printer driver 1300 of the thirteenth embodiment is provided with the communication data determination part 1302 and the printer settings storage part 1206 of the twelfth embodiment as alternatives to the communication data determination part 802 and the printer settings storage part 806 found in the printer driver 800 of the eighth embodiment, and additionally provided with the printer error information registration part 1310. Herein, other constituents of the printer driver 1300 are identical to those of the printer driver 800, therefore being under the same reference numerals and not further described.

Hereinafter, by referring to FIG. 20, it is described how the respective constituents of the printer driver 1300 of the thirteenth embodiment are operated, more focused on the constituents that differ from those of the printer drivers 800 and 1200 of the eighth and twelfth embodiments.

The communication data determination part 1302 analyzes communication data provided from the bi-directional communication part 801 so as to determine the type thereof; control language data; printer language specifications setting data (see FIG. 3); control language specifications setting data (see FIG. 5); or printer error information. For instance, the communication data determination part 1302 determines the type of data by referring to a data identifier provided at the head thereof. Thereafter, the communication data determination part 1302 forwards the communication data according to the determination, i.e., to the control language interpretation part 803 if the data is determined as being control language data, to the printer language specifications setting part 804 if the data is determined as being printer language specifications setting data, to the control language specifications setting part 805 if the data is determined as being control language specifications setting data, and to the printer error information registration part 1310 if determined the data as being printer error information.

The printer error information registration part 1310 registers, in the printer settings storage part 1206, error information in which a certain plot object is assigned at least to one of the printer language commands according to the printer error information relevant to a drawing provided from the communication data determination part 1302. The printer error information registration part 1310 also registers, in the printer settings storage part 1206, error information in which a certain control element is assigned at least to one of the control language commands according to the printer error information relevant to control provided from the communication data determination part 1302.

As is known from the above, according to the printer driver of the thirteenth embodiment, the descriptions in the printer settings storage part are automatically set (updated) according to the printer language specifications setting data and the control language specifications setting data provided from the printer. In addition thereto, the plot objects and the control elements (language commands) causing errors on the printer are automatically stored in the printer settings storage part according to the error information provided from the printer.

In this manner, in addition to the effects described in the foregoing, it becomes possible to generate print data which use no language command causing errors on the printer without the user's intervention, thereby successfully avoiding any printing error on the printer without being noticed by the user.

In the thirteenth embodiment, although the structures of the communication data determination part 1302, the printer settings storage part 1206, and the printer error information registration part 1310 are exemplarily adopted to the printer driver 800 of the eighth embodiment, the structure thereof may be adopted to the printer drivers 900 to 1200 of the ninth to twelfth embodiments.

(Fourteenth Embodiment)

Figure 21:
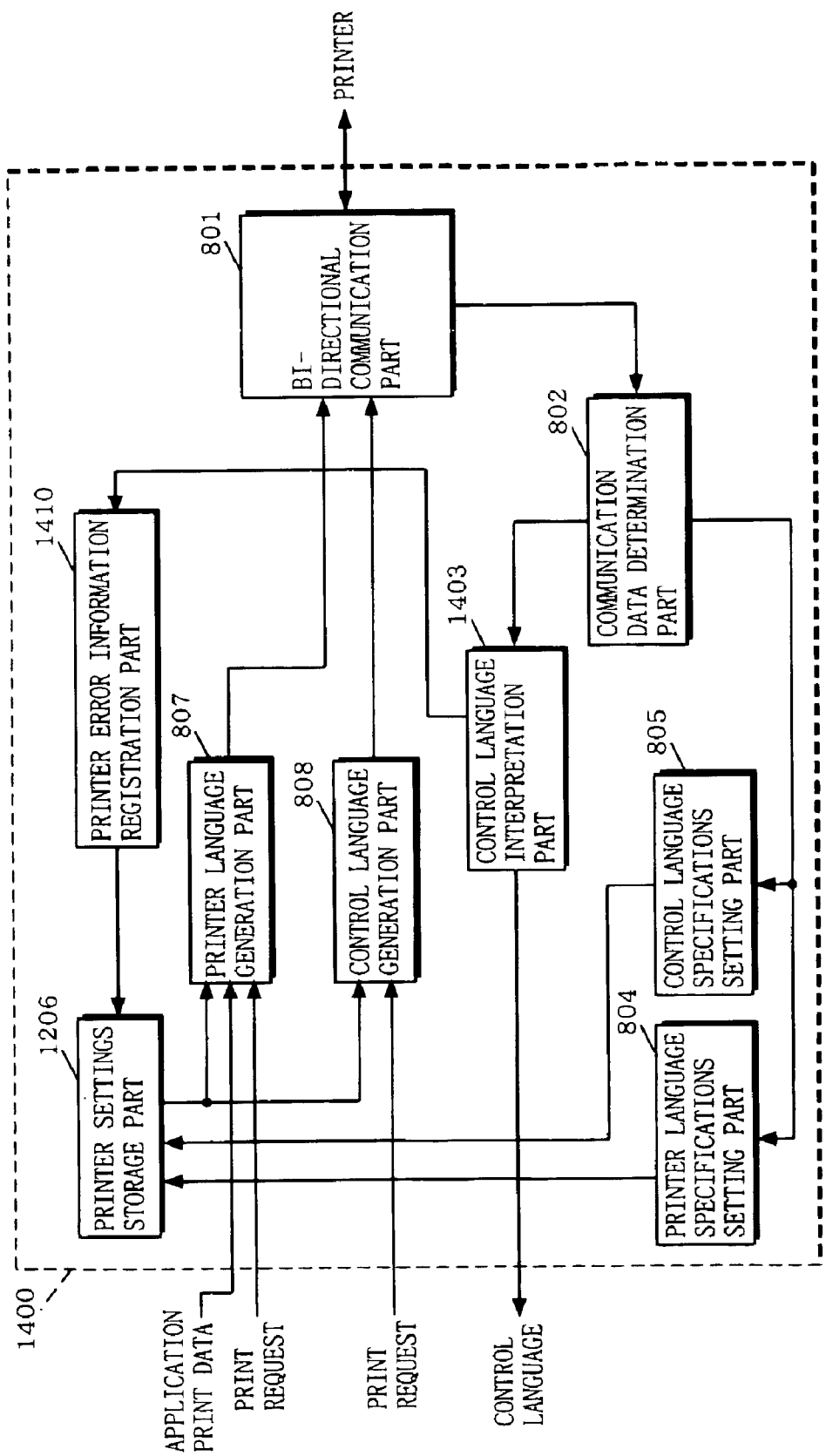
FIG. 21 is a block diagram showing the structure of a printer driver according to a fourteenth embodiment of the present invention.

FIG. 21 is a block diagram showing the structure of a printer driver according to a fourteenth embodiments of the present invention. In FIG. 21, a printer driver 1400 of the fourteenth embodiment is provided with the bi-directional communication part 801, the communication data determination part 802, a control language interpretation part 1403, the printer language specifications setting part 804, the control language specifications setting part 805, the printer settings storage part 1206, the printer language generation part 807, the control language generation part 808, and a printer error information registration part 1410.

The printer driver 1400 of the fourteenth embodiment is a printer driver for use along with the printer 500 of the fifth embodiment.

As shown in FIG. 21, the printer driver 1400 of the fourteenth embodiment is provided with the control language interpretation part 1403 and the printer settings storage part 1206 in the twelfth embodiment as alternatives to the control language interpretation part 803 and the printer settings storage part 806 found in the printer driver 800 of the eighth embodiment, and additionally provided with the printer error information registration part 1410. Herein, other constituents of the printer driver 1400 are identical to those of the printer driver 800, therefore being under the same reference numerals and not further described.

Hereinafter, by referring to FIG. 21, it is described how the respective constituents of the printer driver 1400 of the fourteenth embodiment are operated, more focused on the constituents that differ from those of the printer drivers 800 and 1200 of the eighth and twelfth embodiments.

The control language interpretation part 1403 receives control language data from the communication data determination part 802. The control language interpretation part 1403 interprets the received control language data so as to determine whether or not the data includes printer error information. Thereafter, if the control language data is determined as including the printer error information, the control language interpretation part 1403 extracts the information for output to the printer error information registration part 1410. Note that, as to control language data, such as a response from the printer to an inquiry, the control language interpretation part 1403 forwards the data to the comprehensive control part (not shown) in the host PC as is typically done.

According to the printer error information relevant to a drawing from the control language interpretation part 1403, the printer error information registration part 1410 registers, in the printer settings storage part 1206, error information in which a certain plot object is assigned at least to one of the printer language commands. The printer error information registration part 1410 also registers, in the printer settings storage part 1206, error information in which a certain control element is assigned at least to one of the control language commands according to the printer error information relevant to control from the control language interpretation part 1403.

As is known from the above, according to the printer driver of the fourteenth embodiment, the descriptions in the printer settings storage part are automatically set (updated) according to the printer language specifications setting data and the control language specifications setting data provided from the printer. In addition thereto, the plot objects and the control elements (language commands) causing errors on the printer are automatically stored in the printer settings storage part according to the error information provided from the printer in the format of the control language data.

In this manner, in addition to the effects described in the foregoing, even if the printer driver is incapable of directly receiving the printer error information, it becomes possible to generate print data which use no language command causing errors on the printer without the user's intervention, thereby successfully avoiding any printing error on the printer without being noticed by the user.

In the fourteenth embodiment, although the structures of the control language interpretation part 1403, the printer settings storage part 1206, and the printer error information registration part 1410 are exemplarily adopted to the printer driver 800 of the eighth embodiment, the structures thereof may be adopted to the printer drivers 900 to 1300 of the ninth to thirteenth embodiments.

(Fifteenth Embodiment)

Figure 22:
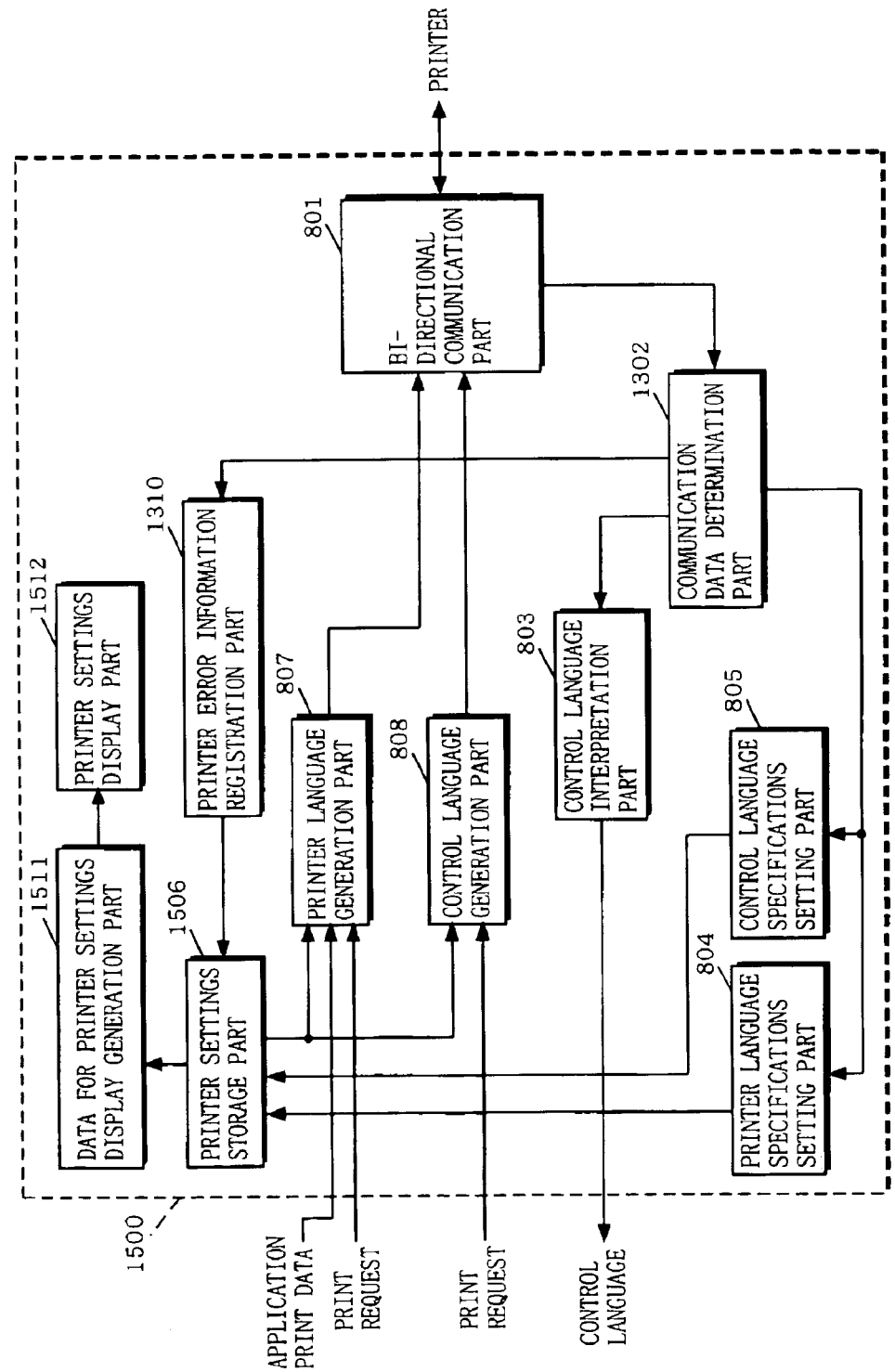
FIG. 22 is a block diagram showing the structure of a printer driver according to a fifteenth embodiment of the present invention.
Figure 24:
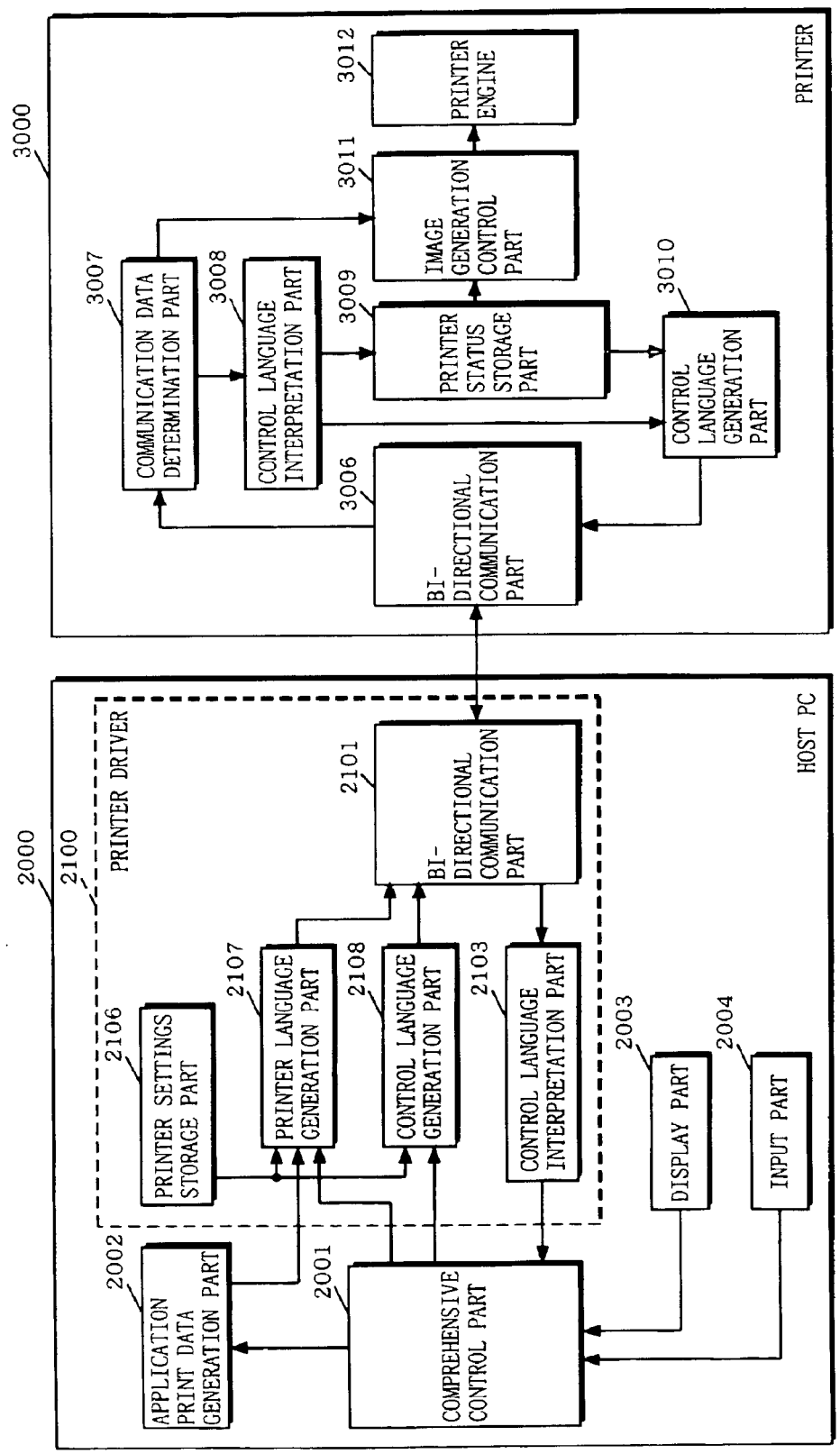
FIG. 24 is a block diagram exemplarily showing the structure of a conventional system environment where a host PC is connected to a printer.

FIG. 22 is a block diagram showing the structure of a printer driver according to a fifteenth embodiment of the present invention. In FIG. 22, a printer driver 1500 of the fifteenth embodiment is provided with the bi-directional communication part 801, the communication data determination part 1302, the control language interpretation part 803, the printer language specifications setting part 804, the control language specifications setting part 805, a printer settings storage part 1506, the printer language generation part 807, the control language generation part 808, the printer error information registration part 1310, a data for printer settings display generation part 1511, and a printer settings display part 1512.

The printer driver 1500 of the fifteenth embodiment is a printer driver for use along with the printer 500 of the fifth embodiment.

As shown in FIG. 22, the printer driver 1500 of the fifteenth embodiment is provided with the printer settings storage part 1506 as an alternative to the printer settings storage part 1206 found in the printer driver 1300 of the thirteenth embodiment, and additionally provided with the data for printer settings display generation part 1511 and the printer settings display part 1512. Herein, other constituents of the printer driver 1500 are identical to those of the printer drivers 800 and 1300, therefore being under the same reference numerals and not further described.

Hereinafter, by referring to FIG. 22, it is described how the respective constituents of the printer driver 1500 of the fifteenth embodiment are operated, more focused on the constituents that differ from those of the printer drivers 800 and 1300 of the eighth and thirteenth embodiments.

After the registration processing carried out by the printer language specifications setting part 804, the control language specifications setting part 805, and the printer error information registration part 1310, the printer settings storage part 1506 stores the correspondence between the plot objects and the printer languages and between the control elements and the control languages, information on printer error, and the like, in a table, as shown in FIGS. 17 and 18.

The data for printer settings display generation part 1511 monitors information in the printer settings storage part 1506, and if any information therein set or updated, reads information corresponding thereto (e.g., printer language specifications, control language specifications, error information) as appropriate, and then generates display data corresponding thereto for output to the printer settings display part 1512.

The printer settings display part 1512 performs display according to the display data generated by the data for printer settings display generation part 1511. A display medium may be a monitor device connected to the host PC, or a separately-provided monitor device only for displaying printer settings, and is not restrictive as long as the user can confirm the details thereof. FIG. 23 is a diagram exemplarily showing a printer setting display screen in the printer settings display part 1512 in FIG. 22, and is indicating the status of the input tray of the printer.

As is known from the above, according to the printer driver of the fifteenth embodiment, the descriptions in the printer settings storage part are automatically set (updated) according to the printer language specifications setting data and the control language specifications setting data provided from the printer. In addition thereto, the set (updated) descriptions are displayed for the user.

In this manner, in addition to the effects described in the foregoing, the user is notified of the printer settings and the descriptions of the error caused on the printer, as appropriate. Therefore, the user can always confirm the automatically-set descriptions and can deal with the error properly and promptly not to increase the damage (secondary damage).

In the fifteenth embodiment, although the structures of the printer settings storage part 1506, the data for printer settings display generation part 1511, and the printer settings display part 1512 are exemplarily adopted to the printer driver 800 of the eighth embodiment, the structures thereof may be adopted to the printer drivers 900 to 1400 of the ninth to fourteenth embodiments.

Further, although described in the eighth to fifteenth embodiments are the printer drivers 800 to 1500 in which the control language specification storage parts 805, 905 and the control language generation part 808 are provided, these constituents may be taken off if the printer has no control for the control elements (e.g., when every statue is fixedly set).

Note that, for a communication medium connecting the printers 100 to 700 and the printers drivers 800 to 1500 (host PCs), a cable capable of bi-directional communications such as printer cable, Ethernet cable, SCSI cable, IEEE1394 cable may be considered. Further, the form of carrying out the printer driver program may be a direct-type object program or an indirect-type interpreter form.

While the invention has been described in detail, the foregoing description is in all aspects illustrative and not restrictive. It is understood that numerous other modifications and variations can be devised without departing from the scope of the invention.

What is claimed is:

1. A printer for connecting to a host information processor via a communication medium, the printer comprising:

printer language specifications storage means for storing, under control of an operating system operable on the host information processor, printer language specifications which indicate a correspondence between a plot object forming application print data generated at printing by an application operable on the host information processor and a printer language for printing the plot object on the printer;

printer language specifications setting data generation means for reading the printer language specifications from said printer language specifications storage means to generate printer language specifications setting data predetermined therefor;

language specifications setting data transmission processing start means for outputting the printer language specifications setting data generated by said printer language specifications setting data generation means with a predetermined timing; and bi-directional communication means for receiving the printer language specifications setting data for transmission to the host information processor.

2. A printer for connecting to a host information processor via a communication medium, the printer comprising:

control language specifications storage means for storing, under control of an operating system operable on the host information processor, control language specifications which indicate a correspondence between a control element forming application print data generated at printing by an application operable on the host information processor and a control language for setting the control element on the printer;

control language specifications setting data generation means for reading the control language specifications from said control language specifications storage means to generate control language specifications setting data predetermined therefor;

language specifications setting data transmission processing start means for outputting the control language specifications setting data generated by said control language specifications setting data generation means with a predetermined timing; and bi-directional communication means for receiving the control language specifications setting data for transmission to the host information processor.

3. The printer as claimed in claim 1, further comprising control language generation means for converting the printer language specifications setting data generated by said printer language specifications setting data generation means into control language data in a predetermined format for output to said language specifications setting data transmission processing start means, wherein said language specifications setting data transmission processing start means outputs the control language data received from said control language generation means to said bi-directional communication means with a predetermined timing.

4. The printer as claimed in claim 2, further comprising control language generation means for converting the control language specifications setting data generated by said control language specifications setting data generation means into control language data in a predetermined format for output to said language specifications setting data transmission processing start means, wherein said language specifications setting data transmission processing start means output the control language data received from said control language generation means to said bi-directional communication means with a predetermined timing.

5. The printer as claimed in claim 1, further comprising communication data determination means for determining a type of communication data received from the host information processor via said bi-directional communication means, wherein when the communication data is data asking for the printer language specifications setting data, said communication data determination means instructs said printer language specifications setting data generation means to generate the printer language specifications setting data.

6. The printer as claimed in claim 2, further comprising communication data determination means for determining a type of communication data received from the host information processor via said bi-directional communication means, wherein when the communication data is data asking for the control language specifications setting data, said communication data determination means instructs said control language specifications setting data generation means to generate the control language specifications setting data.

7. The printer as claimed in claim 5 further comprising control language interpretations means for further interpreting the predetermined control language data determined by said communication data determination means, wherein
when the printer language specifications setting data in the format of the control language data is asked for, said control language interpretation means instructs said printer language specifications setting data generation means to generate the printer language specifications setting data.

8. The printer as claimed in claim 6, further comprising control language interpretation means for further interpreting the predetermined control language data determined by said communication data determination means, wherein
when the control language specifications setting data in the format of the control language data is asked for, said control language interpretation means instructs said control language specifications setting data generation means to generate the control language specifications setting data.

9. The printer as claimed in claim 1, further comprising error detection means for specifying, when an error is observed on the printer, a printer language command causing the error (as an error causing command), and
control language generation means for generating control language data in a predetermined format according to the error causing command for output to said bi-directional communication means.

10. The printer as claimed in claim 2, further comprising error detection means for specifying, when an error is observed on the printer, a control language command causing the error (an error causing command), and
control language generation means for generating control language data in a predetermined format according to the error causing command for output to said bi-directional communication means.

11. The printer as claimed in claim 1, further comprising error detection means for specifying, when an error is observed on the printer, a printer language command causing the error (as an error causing command), and
language specifications update means for updating, according to the error causing command, the printer language specifications stored in said printer language specifications storage means to prevent the host information processor from using the error causing command.

12. The printer as claimed in claim 2, further comprising error detection means for specifying, when an error is observed on the printer, a control language command causing the error as an error causing command, and
language specifications update means for updating, according to the error causing command, the control language specifications stored in said control language specifications storage means to prevent the host information processor from using the error causing command.

13. The printer as claimed in claim 3, further comprising printer settings change means for notifying said control language generation means of details of a setting change made by a user on the printer, wherein
said control language generation means generates the control language data indicating the notified details of the setting change for output to said language specifications setting data transmission processing start means.

14. The printer as claimed in claim 4, further comprising printer settings change means for notifying said control language generation means of details of a setting change made by a user on the printer, wherein
said control language generation means generates the control language data indicating the notified details of the setting change for output to said language specifications setting data transmission processing start means.

15. The printer as claimed in claim 11, further comprising printer settings change means for notifying said language specifications update means of details of a setting change made by a user on the printer, wherein
said language specifications update means updates the printer language specifications according to the notified details of the setting change.

16. The printer as claimed in claim 12, further comprising printer settings change means for notifying said language specifications update means of details of a setting change made by a user on the printer, wherein
said language specifications update means updates the printer language specifications according to the notified details of the setting change.

17. The printer as claimed in claim 3, further comprising device change detection means for notifying said control language generation means of details of a structural change made by a user on the printer, wherein
said control language generation means generates the control language data which indicates the notified details of the structural change for output to said language specifications setting data transmission processing start means.

18. The printer as claimed in claim 4, further comprising device change detection means for notifying said control language generation means of details of a structural made by a user on the printer, wherein
said control language generation means generates the control language data which indicates the notified details of the structural change for output to said language specifications setting data transmission processing start means.

19. The printer as claimed in claim 11, further comprising device change detection means for notifying said language specifications update means of details of a structural change made by a user on the printer, wherein
said language specifications update means updates the printer language specifications according to the notified details of the structural change.

20. The printer as claimed in claim 12, further comprising device change detection means for notifying said language specifications update means of details of a structural change made by a user on the printer, wherein
said language specifications update means updates the printer language specifications according to the notified details of the structural change.

21. A printer driver provided in a host information processor for connecting to a printer via a communication medium, the printer driver comprising:
bi-directional communication means for receiving communication data from the printer;
communication data determination means for determining, under control of an operating system operable on the host information processor, whether or not the communication data received by said bi-directional communication means is printer language specifications setting data which indicates, a correspondence between a plot object forming application print data generated at printing by an application operable on the host information processor and a printer language for printing the plot object on the printer;

printer language specifications setting means for registering printer language specifications according to the printer language specifications setting data determined by said communication data determination means;

printer settings storage means for storing the printer language specifications according to the registering carried out by said printer language specifications setting means; and printer language generation means for obtaining, according to the application print data at printing, the printer language corresponding to the plot object from said printer setting storage means to generate printer language print data for transmission to the printer via said bi-directional communication means.

22. A printer driver provided in a host information processor for connecting to a printer via a communication medium, the printer driver comprising:

bi-directional communication means for receiving communication data from the printer;

communication data determination means for determining, under control of an operating system operable on the host information processor, whether or not the communication data received by said bi-directional communication means is control language specifications setting data which indicates a correspondence between a control element forming application print data generated at printing by an application operable on the host information processor and a control language for setting the control element on the printer;

control language specifications setting means for registering control language specifications according to the control language specifications setting data determined by said communication data determination means;

printer settings storage means for storing the control language specifications according to the registering carried out by said control language specifications setting means; and control language generation means for obtaining, according to the application print data at printing, the control language corresponding to the control element from said printer settings storage means to generate control language print data for transmission to the printer via said bi-directional communication means.

23. The printer driver as claimed in claim 21, further comprising control language interpretation means for further interpreting the printer language specifications setting data determined by said communication data determination means, wherein when the printer language specifications setting data is in a format of control language data, said control language interpretation means instructs said printer language specifications setting means to register the printer language specifications.

24. The printer driver as claimed in claim 22, further comprising control language interpretation means for further interpreting the control language specifications setting data determined by said communication data determination means, wherein when the control language specifications setting data is in a format of control language data, said control language interpretation means instructs said control language specifications setting means to register the control language specifications.

25. The printer driver as claimed in claim 21, further comprising printer setting data request generation means for generating requesting data asking the printer for transmission of the printer language specifications setting data, and transmitting the requesting data to said bi-directional communication means.

26. The printer driver as claimed in claim 22, further comprising printer setting data request generation means for generating requesting data asking the printer for transmission of the control language specifications setting data, and transmitting the requesting data to said bi-directional communication means.

27. The printer driver as claimed in claim 21, wherein the printer language specifications stored in said printer settings storage means are provided with, in addition to the correspondence between the plot object and the printer language, link information indicating whether or not there is another plot object equivalent in drawing to the plot object, the printer device further comprises printer error information registration means for registering in said printer settings storage means, according to a printer language command causing an error observed on the printer as an error causing command, printer error information which indicates a plot object using the error causing command that causes the error at printer, and said printer language generation means refers to the printer error information and the link information stored in said printer settings storage means, and then replaces the plot object causing the error on the printer with another plot object link thereto for generation of the printer language print data.

28. The printer driver as claimed in claim 22, wherein the control language specifications stored in said printer settings storage means are provided with, in addition to the correspondence between the control element and the control language, link information indicating whether or not there is another control element equivalent to the control element, the printer device further comprises printer error information registration means for registering in said printer settings storage means, according to a control language command causing an error observed on the printer as an error causing command, printer error information which indicates a control element using the error causing command that causes the error at printing, and said control language generation means refers to the printer error information and the link information stored in said printer settings storage means, and then replaces the control element causing the error on the printer with another control element linked thereto for generation of the control language print data.

29. The printer driver as claimed in claim 27, wherein, when the printer error information is provided from the printer, said communication data determination means further determines the printer error information received via said bi-directional communication means for output to said printer error information registration means.

30. The printer driver as claimed in claim 28, wherein, when the printer error information is provided from the printer, said communication data determination means further determines the printer error information received via said bi-directional communication means for output to said printer error information registration means.

31. The printer driver as claimed in claim 29, further comprising control language interpretation means for further interpreting the printer language specifications setting data determined by said communication data determination means, wherein, when the printer error information provided from the printer is in a format of control language data, said control language interpretation means further interprets the control language data to extract the printer error information therefrom for output to said printer error information registration means.

32. The printer driver as claimed in claim 30, further comprising control language interpretation means for further interpreting the control language specifications setting data determined by said communication data determination means, wherein, when the printer error information provided from the printer is in a format of control language data, said control language interpretation means further interprets the control language data to extract the printer error information therefrom for output to said printer error information registration means.

33. The printer driver as claimed in claim 21, further comprising, data for printer settings display generation means for, when information in said printer settings storage means is set or updated reading the information to generate display data corresponding thereto, and printer settings display means for performing information display by an arbitrary display medium according to the display data generated by said data for printer settings display generation means.

34. The printer driver as claimed in claim 22, further comprising data for printer settings display generation for, when information in said printer settings storage means is set or updated, reading the information to generate display data corresponding thereto, and printer settings display means for performing information display by an arbitrary display medium according to the display data generated by said data for printer settings display generation means.

35. A printer driver program recorded on a recording medium to be run on a computer device for realizing an operational environment on the computer device, the printer driver program being operable to cause the computer device to:

receive communication data from a printer;

determine the control of an operating system operable on a host information processor, whether or not the communication data is printer language specifications setting data which indicates a correspondence between a plot object forming application print data generated at printing by an application operable on the host information processor and a printer language for printing the plot object on the printer;

register printer language specifications according to the determined printer language specifications setting data; and generate with the application print data at printing, printer language print data for transmission to the printer according to the printer language corresponding to the registered plot object.

36. A printer driver program recorded on a recording medium to be run on a computer device for realizing an operational environment on the computer device, the printer driver program operable to cause the computer device to:

receive communication data from a printer;

determine, under control of an operating system operable on a host information processor, whether or not the communication data is control language specifications setting data which indicates a correspondence between a control element forming application print data generation at printing by an application operable on the host information processor and a control language for setting the control element on the printer;

register control language specifications according to the determined control language specifications setting data; and generate, with the application print data at printing, control language print data for transmission to the printer according to the correspondence between the registered control element and the control language.

37. The printer driver program as claimed in claim 35, further operable to cause the computer device to interpret the printer language specifications setting data determined in said determination operation, wherein when the printer language specifications setting data is in a format of said control language data, the printer language specifications are registered in said interpretation operation.

38. The printer language program as claimed in claim 36, further operable to cause the computer device to interpret printer language specifications setting data determined in said determination operation, wherein when the control language specifications setting data is in a format of the control language data, the control language specifications are registered in said interpretation operation.

39. The printer driver program as claimed in claim 35, further operable to cause the computer device to generate and transmit requesting data asking the printer for transmission of the printer language specifications setting data.

40. The printer driver program as claimed in claim 36, further operable to cause the computer device to generate and transmit requesting data asking the printer for transmission of the control language specifications setting data.

41. The printer driver program as claimed in claim 35, wherein the registered printer language specifications are provided, in addition to the correspondence between the plot object and the printer language, with link information which indicates whether or not there is another plot object equivalent in drawing to the plot object, the printer driver program is further operable to register, according to a printer language command causing an error observed on the printer as an error causing command, printer error information which indicates that a plot object using the error causing command the error at printing, and said generation operation refers to, the registered printer error information and the link information, and then replaces the plot object causing the error on the printer is replaced with another plot object linked thereto to generate the printer language print data.

42. The printer data program as claimed in claim 36, wherein the registered control language specifications is provided, in addition to the correspondence between the control element and the control language, with link information which indicates whether or not there is another control element equivalent to the control element, the printer driver program is further operable to register, according to a control language command causing an error observed on the printer as an error causing command, printer error information which indicates a control element using the error causing command causes the error at printing, and said generation operation refers to the registered printer error information and the link information, and then replaces the control element causing the error on the printer with another control element linked thereto to generate the control language print data.

43. The printer driver program as claimed in claim 41, wherein, when the printer error information is provided from the printer, in said determination operation, the printer error information is further determined.

44. The printer device program as claimed in claim 42, wherein, when the printer error information is provided from the printer, in said determination operation, the printer error information is further determined.

45. The printer driver program as claimed in claim 43, further operable to cause the computer device to interpret the printer language specifications setting data determined in said determination operation, wherein, when the printer error information provided from the printer is in a format of control language data, said interpretation operation further interprets the control language data to extract the printer error information therefrom.

46. The printer driver program as claimed in claim 44, further operable to cause the computer device to interpret the printer language specifications setting data determined in said determination operation, wherein, when the printer error information provided from the printer is in a format of control language data, said interpretation operation further interprets the control language data to extract the printer error information therefrom.

47. The printer driver program as claimed in claim 35, further operable to cause the computer device to:

generate, when registered information is set or updated, display data corresponding to the information after reading the information as appropriate; and perform information display by an arbitrary display medium according to the display data.

48. The printer driver program as claimed in claim 36, further operable to cause the computer device to:

generate, when registered information is set or updated, display data corresponding to the information after reading the information as appropriate, and perform information display by an arbitrary display medium according to the display data.

* * * * *

UNITED STATES PATENT AND TRADEMARK OFFICE
CERTIFICATE OF CORRECTION

PATENT NO. : 6,879,408 B1
DATED : April 12, 2005
INVENTOR(S) : Ryuichi Hori et al.

It is certified that error appears in the above-identified patent and that said Letters Patent is hereby corrected as shown below:

Column 38,
Line 44, replace "output" with -- outputs --.

Column 39,
Line 4, insert -- , -- after "5".
Line 5, replace "interpretations" with -- interpretation --.
Lines 27 and 43, replace "(as an error causing command)," with -- as an error causing command, --.
Line 35, replace "(an error causing command)," with -- as an error causing command, --.

Column 40,
Line 35, replace "structural made" with -- structural change made --.
Line 66, replace "indicates," with -- indicates --.

Column 42,
Line 28, replace "printer," with -- printing, --.

Column 43,
Line 22, replace "comprising," with -- comprising --.
Line 24, replace "updated" with -- updated, --.
Line 31, replace "generation for," with -- generation means for, --.
Line 45, replace "determine the" with -- determine, under --.
Line 56, replace "generate" with -- generate, --.

UNITED STATES PATENT AND TRADEMARK OFFICE
CERTIFICATE OF CORRECTION

PATENT NO. : 6,879,408 B1
DATED : April 12, 2005
INVENTOR(S) : Ryuichi Hori et al.

It is certified that error appears in the above-identified patent and that said Letters Patent is hereby corrected as shown below:

Column 44,
Lines 3-4, replace "generation" with -- generated --.
Line 23, replace "interpret" with -- interpret the --.
Line 48, replace "command the" with -- command causes the --.
Line 55, replace "data" with -- driver --.

Signed and Sealed this

Thirtieth Day of August, 2005

JON W. DUDAS
*Director of the United States Patent and Trademark Office*